(12) United States Patent
Yanari

(10) Patent No.: US 6,412,948 B2
(45) Date of Patent: Jul. 2, 2002

(54) PROGRESSIVE POWER MULTIFOCAL LENS

(75) Inventor: Mitsuhiro Yanari, Tokyo (JP)

(73) Assignee: Nikon-Essilor Co., Ltd., Tokyo (JP)

( * ) Notice: Subject to any disclaimer, the term of this patent is extended or adjusted under 35 U.S.C. 154(b) by 0 days.

(21) Appl. No.: 09/851,342

(22) Filed: May 9, 2001

(30) Foreign Application Priority Data

May 10, 2000 (JP) ........................................ 2000-137730

(51) Int. Cl.[7] ................................................. G02C 7/06
(52) U.S. Cl. ....................................... 351/169; 351/177
(58) Field of Search ................................. 351/168, 169, 351/170, 171, 172

(56) References Cited

U.S. PATENT DOCUMENTS 5,708,492 A     1/1998   Kitani ........................ 351/169
5,861,935 A     1/1999   Morris et al. ................ 351/169

OTHER PUBLICATIONS

Hagiwara, H. (Editor), *Physiology of the Eye*, Igaku Shoin Ltd., pp. 325–328 (1966).

Primary Examiner—Scott J. Sugarman
(74) Attorney, Agent, or Firm—Miles & Stockbridge P.C.

(57) ABSTRACT

A series of progressive power multifocal lenses having a plurality of base curves which are designed to have substantially the same basic lens specifications and substantially the same optical characteristics in the worn state with respect to all of the base curves, so as to have an excellent optical performance in the worn state. The progressive power multifocal lens secures a wide clear vision range with a smaller amount of astigmatism in the far portion and a smaller amount of blur of the image due to a dioptric power error.

15 Claims, 9 Drawing Sheets

PROGRESSIVE POWER MULTIFOCAL LENS

This application claims the benefit of Japanese Patent application No. 2000-137730 which is hereby incorporated by reference.

BACKGROUND OF THE INVENTION

1. Field of the Invention

The present invention relates to a progressive power multifocal lens, and more specifically, to a progressive power multifocal lens which is used to assist an accommodation power of an eye.

2. Related Background Art

In order to correct presbyopic eyes, a single focal lens, a bifocal lens, a progressive power multifocal lens, and the like, are conventionally used. Especially with respect to a progressive power multifocal lens, out of these lenses, the glasses which use the progressive power multifocal lenses are not required to be replaced or removed for looking at a distant point and for looking at a near point. For the outward looks, a progressive power multifocal lens has no border line, unlike in the case of a bifocal lens. As a result, a demand on progressive multifocal lenses is considerably increasing recently.

A progressive multifocal lens is a spectacle lens to assist an accommodation power of an eye when the accommodation power of the eye becomes weak so that a near vision is difficult to see clearly. In general, a progressive multifocal lens has a far vision correction portion which is positioned in an upper part of the lens when the lens is worn (hereinafter called "the far portion"), a near vision correction portion which is positioned in an lower part of the lens when the lens is worn (hereinafter called "the near portion"), and a progressive power portion in which the refracting power is continuously changed between the both portions (hereinafter called "the intermediate portion"). Note that the terms "upper", "lower", "horizontal" and "vertical" in the present invention are used to refer to positional relations in the lens when it is worn. For instance, the lower part of the far portion indicates an area which is inside the far portion and close to the intermediate portion.

FIG. 1 is a view for showing an outline of the divided regions of a progressive power multifocal lens which is designed symmetrically. The progressive power multifocal lens shown in FIG. 1 comprises a far portion F which is located in an upper part of the lens when it is worn, a near portion N located in a lower part, and an intermediate portion P located between the far portion and the near portion in which the refracting power is continuously changed. As for the shape of a lens surface, an intersecting line MM' of a cross section along the meridian passing through approximately the center of the lens surface and extending vertically from top to bottom and the lens surface on the object side (the side opposite to the eyes) is used as a reference line for expressing lens specifications such as the addition power of the lens and is also used as a significant reference line in the lens design. In the progressive power multifocal lens thus symmetrically designed, the center OF of far portion of the far portion F, an eyepoint E serving as a fitting point, the geometric center OG of the lens surface, and the center ON of the near portion are located on the center line MM' serving as the reference line.

FIG. 2 is a view for showing an outline of the divided portions of a progressive power multifocal lens in which the near portion N is asymmetrically located in consideration of the fact that the center of the near portion ON comes close to the nasal side when the lens is worn (hereinafter called an "asymmetrical type progressive power multifocal lens"). Also in such an asymmetrical type progressive power multifocal lens as shown in FIG. 2, the center line MM' which comprises the intersecting line of the cross section which passes through the center of distance vision portion OF of the far portion F, the eyepoint E for the distance portion, the geometric center OG of the lens surface, and the center of near vision portion ON and the object-side lens surface is used as the reference line.

In the present invention, these reference lines are collectively called the "principal meridian". The center of the far portion F and the center of the near portion N are used as the reference positions for measuring lens powers. The reference point for measuring the lens power of a far portion is called the center of distance vision portion OF, while the reference point for measuring the lens power of a near portion is called the center of near vision portion ON. Furthermore, the mean surface refracting power of the center of distance vision portion OF is defined as a base curve, and the mean dioptric power of a transmitting light beam which passes through the center of distance vision portion OF is defined as the reference mean dioptric power in the far portion (hereinafter called "the distance dioptric power"). Normally, the center of the near portion is coincident with the eyepoint for the near vision. The terms "the center of distance vision portion" or "the center of near vision portion" does not indicate the geometric center in each of the portions, but indicates the functional center when the lens power is measured or the lens is worn.

According to the present invention, the mean surface refracting power (hereinafter called "the refracting power") and the surface astigmatism (hereinafter called "the astigmatism") can be respectively expressed by the following equations (a) and (b), where the maximum main curvature is $\phi$max and the minimum main curvature is $\phi$min at an arbitrary point on the progressive power multifocal surface:

$$\text{the refracting power} = (\phi\text{max} + \phi\text{min}) \times (n-1)/2 \quad \text{(a)};$$

and $$\text{the astigmatism} = (\phi\text{max} - \phi\text{min}) \times (n-1) \quad \text{(b)}.$$

Also according to the present invention, the mean dioptric power and the astigmatism can be respectively expressed by the following equations (c) and (d), where the maximum dioptric power and the minimum dioptric power in a light beam transmitted through an arbitrary point on the progressive power multifocal surface are defined as Dmax and Dmin, respectively:

$$\text{the dioptric power} = (D\text{max} + D\text{min})/2 \quad \text{(c)};$$

and $$\text{the astigmatism} = (D\text{max} - D\text{min}) \quad \text{(d)}.$$

Furthermore, according to the present invention, the mean surface additional refracting power (hereinafter called "the surface additional refracting power") is a refracting power which is obtained by subtracting the base curve from the refracting power at an arbitrary point on the progressive power multifocal surface. On the other hand, the mean additional dioptric power (hereinafter called the "additional dioptric power") is a dioptric power which is obtained by subtracting the distance dioptric power from the mean dioptric power (hereinafter called the "dioptric power") of a light beam passing through an arbitrary point on the progressive power multifocal surface power.

It is noted that, in the progressive power multifocal lens, a positive refracting power (or dioptric power) is continuously imparted from the center of distance vision portion OF toward the center of near vision portion ON on the principal meridian MM' which approximately passes through the geometric center of the lens, and a value which is obtained by subtracting the refracting power (or dioptric power) of the center of distance vision portion OF from the additional refracting power (or additional dioptric power) of the center of near vision portion ON at which this addition refracting power (or additional dioptric power) approximately reaches the maximum is called the additional power of the progressive power multifocal lens. A progressive power multifocal lens which has wide clear vision ranges of all of the far vision portion F, the intermediate portion P, and the near portion N are wide, small fluctuation, distortion, and the like of an image, and is easily worn is an ideal progressive power multifocal lens.

Incidentally, as for a conventional progressive power multifocal lens, generally the optical characteristics of the progressive power multifocal surface (refracting surface) thereof were mainly discussed. That is, the performance of a progressive power multifocal lens was often evaluated in terms of a distribution of the refracting power (or a distribution of the additional refracting power), a distribution of astigmatism, or the like, of the progressive power multifocal surface. For this reason, the lens designer mainly aimed of obtaining a distribution of the refracting power which is suitable for a use of the progressive power multifocal lens, securely forming a wide space for a so-called a clear vision range which has astigmatism of not more than a predetermined value, and suppressing the maximum value of the astigmatism to the minimum, taking swim, fluctuation or distortion of an image which may be caused upon movement of the eye into consideration.

However, in an actual spectacle lens, the optical characteristics of the progressive power multifocal surface of the lens are not necessarily coincident with the optical characteristics of the lens when it is actually worn by the wearer. For this reason, recently, in order to improve the optical characteristics of the lens when the wearer actually wears the lens, not only the optical characteristics of the progressive power multifocal surface, but also the optical performance of the lens in a state which is closer to the worn state come to be evaluated. That is, the optical performance of the lens comes to be evaluated by a light beam transmitted through the lens.

In general, the relation between the lens curvature and the lens power to make the astigmatism of a light beam transmitted through the lens to be the minimum can be obtained from, for instance, a Tscherning's Ellipse. That is, it is well known that generation of astigmatism in the peripheral area of the lens can be suppressed by selecting an optimal combination of curvatures which can be obtained from this Tscherning's Ellipse. However, when the optimal combination of curvatures obtained from this Tscherning's Ellipse is used, there is a tendency that the curvature of the base curve becomes large and the lens thickness also becomes large. As a result, with respect to progressive power multifocal lenses recently manufactured, for reducing the thickness of the lens or improving the external appearance, or for a reason for manufacturing, a curvature smaller than that obtained by such an optimal combination of curvatures is mainly selected as the base curve.

Accordingly, a distribution of the refracting power or a distribution of the astigmatism on the progressive power multifocal surface have the same tendency with a distribution of the dioptric power or a distribution of the astigmatism of a light which passes through the lens to enter an eye of the wearer of the lens limitedly in most cases in an area in which a light from an object enters the lens surface at an approximately right angle, that is, an area in the vicinity of the optical axis of the lens, such as, an area around the fitting point of the lens. On the other hand, a light entering an eye of the wearer through a position separated from the optical axis of the lens is incident on the lens surface in a slanting manner. Thus, astigmatism is generated even when a light passing through a position at which astigmatism on the lens surface is substantially zero passes through the lens, and this light is to enter an eye of the wearer in a state in which the dioptric power deviates from the dioptric power for distance vision which serves as the reference dioptric power. This tendency is different depending on the curvature of the lens on the prescription side or the thickness of the central portion thereof, and becomes larger toward the periphery of the lens.

More specifically, in a progressive power multifocal lens having a plurality of base curves, when a distribution of the refracting power and that of astigmatism of the progressive power multifocal surface are designed to be equal with respect to the base curves, the distribution of dioptric power and the distribution of astigmatism of a transmitted light beam are substantially different depending on each of the base curves. As a result, in order to obtain a series of progressive power multifocal lenses having a plurality of base curves in which optical characteristics, such as a distribution of the additional dioptric power or a distribution of astigmatism, of a transmitted light in the worn state are equal with respect to the plurality of base curves, such a design is required which optimizes the progressive power multifocal surface taking into consideration a manufacture range of each of the base curves.

Recently, such conventional technologies in which the optical performance by these transmitted lights is evaluated in a progressive power multifocal lens are proposed. However, according to these conventional technologies, a portion having an astigmatism in a predetermined amount or less, more specifically an astigmatism of 0.50 diopters or less, is defined as a clear vision range, and it is discussed in most cases only to secure this clear vision range to be wide. That is, according to the conventional technologies, optimization of the dioptric power distribution is scarcely discussed. Furthermore, a technology for optimizing a far portion as a surface to conform to each of the base curves having different curvatures has not been yet proposed.

To suppress the astigmatism to the minimum is significant and essential in order to widen the clear vision range in the worn state. However, particularly with respect to the far portion, it is not sufficient to define the clear vision range only in terms of an amount of the astigmatism. That is, in a portion in which the dioptric power largely deviates from the distance dioptric power which is predetermined by the prescription, even if the astigmatism is in an amount less than a predetermined value which is defined for the clear vision range, a blur of the image is generated due to this dioptric power error, so that the wearer can not see an object distinctly in a distance vision. An influence of the dioptric power error in the far portion for distance vision is greater than that in the near portion for near vision. For this reason, it is more important in the far vision portion to design the lens taking into consideration a dioptric power error from a predetermined distance dioptric power, rather than in the near portion.

SUMMARY OF THE INVENTION

The present invention has been contrived taking the above-described problems into consideration, and has its object to provide a series of progressive power multifocal lenses having a plurality of base curves which are designed to have substantially the same basic lens specifications and substantially the same optical characteristics in the worn state with respect to all of the base curves, so as to have an excellent optical performance in the worn state. The present invention particularly has its object to provide a progressive power multifocal lens which can secure a wide clear vision range with a smaller amount of astigmatism in the far portion and a smaller amount of blur of the image due to a dioptric power error.

In order to solve the above problems, according to a first invention, there is provided a series of progressive power multifocal lenses which have a plurality of base curves designed to have substantially the same basic lens specifications, each lens having a far vision correction portion corresponding to a distant vision, a near vision correction portion corresponding to a near vision, and a progressive portion for continuously connecting the refracting powers of the surfaces of the both portions between the far vision correction portion and the near vision correction portion along the principal meridian for dividing the refracting surface of each lens into the nasal side portion and the temporal side portion, characterized in that:

the following condition (1) is satisfied at least in either one of the nasal side portion and the temporal side portion with respect to the principal meridian which satisfies $15 \leq |x| \leq 20$:

$$\Delta P_S(x,0) > \Delta P_L(x,0) \qquad (1),$$

Where:

in a first progressive power multifocal lens having a first base curve $BC_L$ selected from the plurality of base curves, the mean surface refracting power of a point on a lens refracting surface which is separated by x (mm) in the horizontal direction from an eyepoint for a distance vision in a state in which the lens is worn is defined as $P_L(x,0)$ (diopter), and the mean surface additional refracting power which is obtained by subtracting the first base curve $BC_L$ from the mean surface refracting power is defined as $\Delta P_L(x,0)$ $\{=P_L(x,0)-BC_L\}$ (diopter): and in a second progressive power multifocal lens having a second base curve $BC_S$ which has a substantially smaller curvature than the first base curve $BC_L$ and selected from the plurality of base curves and having substantially the same additional power as the additional power of the first progressive multifocal lens, the mean surface refracting power of a point on a lens refracting surface which is separated by x (mm) in the horizontal direction from the eyepoint in a state in which the lens is worn as $P_S(x,0)$ (diopter), and the mean surface additional refracting power which is obtained by subtracting the second base curve $BC_S$ from the mean surface refracting power is defined as $\Delta P_S(x,0)$ $\{=P_S(x,0)-BC_S\}$ (diopter).

According to a second invention, there is provided a series of progressive power multifocal lenses which have a plurality of base curves designed to have substantially the same basic lens specifications, each lens having a far vision correction portion corresponding to a distant vision, a near vision correction portion corresponding to a near vision, and a progressive portion for continuously connecting the refracting powers of the surfaces of the both portions between the far vision correction portion and the near vision correction portion along the principal meridian for dividing the refracting surface of each lens into the nasal side portion and the temporal side portion characterized in that:

the following condition (2) is satisfied at least in either one of the nasal side portion and the temporal side portion with respect to the principal meridian which satisfies $15 \leq (x^2+h^2)^{1/2} \leq 20$:

$$\Delta P_S(x,h) > \Delta P_L(x,h) \qquad (2),$$

Where:

in a first progressive power multifocal lens having a first base curve $BC_L$ selected from the plurality of base curves, the mean surface refracting power of a point on a lens refracting surface which is separated by x (mm) in the horizontal direction in a state in which the lens is worn from the center of distance vision portion which is separated by h (mm) from the eyepoint for a distance vision in the vertical direction in a state in which the lens is worn is defined as $P_L(x,h)$ (diopter), and the mean surface additional refracting power which is obtained by subtracting the first base curve $BC_L$ from the mean surface refracting power $P_L(x,h)$ is defined as $\Delta P_L(x,h)$ $\{=P_L(x,h)-BC_L\}$ (diopter): and in a second progressive power multifocal lens having a second base curve $BC_S$ which has a substantially smaller curvature than the first base curve $BC_L$ and selected from the plurality of base curves and having substantially the same additional power as the additional power of the first progressive multifocal lens, the mean surface refracting power of a point on a lens refracting surface which is separated by x (mm) in the horizontal direction in a state in which the lens is worn is defined as $P_S(x,h)$ (diopter), and the mean surface additional refracting power which is obtained by subtracting the second base curve $BC_S$ from the mean surface refracting power is defined as $\Delta P_S(x,h)$ $\{=P_S(x,h)-BC_S\}$ (diopter).

According to a third invention, there is provided a series of progressive power multifocal lenses which have a plurality of base curves designed to have substantially the same basic lens specifications, each lens having a far vision correction portion corresponding to a distant vision, a near vision correction portion corresponding to a near vision, and a progressive portion for continuously connecting the refracting powers of the surfaces of the both portions between the far vision correction portion and the near vision correction portion along the principal meridian for dividing the refracting surface of each lens into the nasal side portion and the temporal side portion, characterized in that:

the following condition (3) is satisfied at least in either one portion of the nasal side portion and the temporal side portion with respect to the principal meridian which satisfies $15 \leq (x^2+y^2)^{1/2} \leq 20$:

$$\Delta P_S(x,y) > \Delta P_L(x,y) \qquad (3),$$

Where:

in a first progressive power multifocal lens having a first base curve $BC_L$ selected from the plurality of base curves, the mean surface refracting power of a point on a lens refracting surface which is separated by x (mm) in the horizontal direction in a state in which the lens is worn from the eyepoint for a distance vision and which is separated by y (mm) in the vertical direction from the eyepoint in a state in which the lens is worn is defined as $P_L(x,h)$ (diopter), and the mean surface additional refracting power which is obtained by subtracting the first base curve $BC_L$ from the mean surface refracting power is defined as $\Delta P_L(x,y)$ $\{=P_L(x,y)-BC_L\}$ (diopter): and in a second progressive power multifocal lens having a second base curve $BC_S$ which has a substantially smaller curvature than the first base curve $BC_L$ and selected from the plurality of base curves and having substantially the same additional power as the additional power of the first progressive multifocal lens, the mean surface refracting power of an arbitrary point on a lens refracting surface which is separated by x (mm) in the horizontal direction in a state in which the lens is worn from the eyepoint and which is separated by y (mm) from the eyepoint in the vertical direction in a state in which the lens is worn is defined as $P_S(x,y)$ (diopter), and the mean surface additional refracting power which is obtained by subtracting the second base curve $BC_S$ from the mean surface refracting power is defined as $\Delta P_S(x,y)$ $\{=P_S(x,y)-BC_S\}$ (diopter).

According to a preferred aspect of the third invention, the following condition (4) may be satisfied in at least one of the far vision correction portion on the nasal side and that on the temporal side with respect to the principal meridian which satisfies $15 \leq (x^2+y^2)^{1/2} \leq 20$:

$$-0.850 \leq (\Delta P_L(x,y) - \Delta P_S(x,y))/(BC_L - BC_S) \leq -0.010 \quad (4).$$

According to a first preferred aspect of the first to third inventions, the following condition (5) may be satisfied at least in either one of the nasal side portion and the temporal side portion with respect to the principal meridian which satisfies $15 \leq |x| \leq 20$:

$$C_L(x,0) > C_S(x,0) \quad (5),$$

Where:

in the first progressive multifocal lens, the surface astigmatism of a point on a lens refracting surface which is separated from the eyepoint by x (mm) in the horizontal direction in a state in which the lens is worn is defined as $CL(x,0)$ (diopter); and in the second progressive multifocal lens, the surface astigmatism of a point on a lens refracting surface which is separated from the eyepoint by x (mm) in the horizontal direction in a state in which the lens is worn is defined as $CS(x,0)$ (diopter).

According to a second preferred aspect of the first to third inventions, the following condition (6) may be satisfied at least in either one of the nasal side portion and the temporal side portion with respect to the principal meridian which satisfies $15 \leq (x^2+h^2)^{1/2} \leq 20$:

$$C_L(x,h) > C_S(x,h) \quad (6),$$

Where:

in the first progressive multifocal lens, the surface astigmatism of a point on a lens refracting surface which is separated by x (mm) in the horizontal direction in a state in which the lens is worn from the center of distance vision portion which is separated from the eyepoint by h (mm) in the vertical direction in a state in which the lens is worn is defined as $CL(x,h)$ (diopter); and in the second progressive multifocal lens, the surface astigmatism of a point on a lens refracting surface which is separated from the center of distance vision portion by x (mm) in the horizontal direction in a state in which the lens is worn is defined as $C_S(x,h)$ (diopter).

According to a third preferred aspect of the first to third inventions, the following condition (7) may be satisfied at least in either one of the nasal side portion and the temporal side portion with respect to the principal meridian which satisfies $0 \leq y \leq h$ and $15 \leq (x^2+y^2)^{1/2} \leq 20$:

$$C_L(x,y) > C_S(x,y) \quad (7),$$

Where:

a distance between the eyepoint and the center of distance vision portion in a state in the vertical direction in which the lens is worn is defined as h (mm);

in the first progressive multifocal lens, the surface astigmatism of an arbitrary point on a lens refracting surface which is separated by x (mm) in the horizontal direction in a state in which the lens is worn from the eyepoint and is separated by y (mm) in the vertical direction in a state in which the lens is worn from the eyepoint is defined as $C_L(x,y)$ (diopter); and in the second progressive multifocal lens, the surface astigmatism of an arbitrary point on a lens refracting surface which is separated by x (mm) in the horizontal direction in the lens wearing state from the eyepoint and is separated by y (mm) in the vertical direction in a state in which the lens is worn from the eyepoint is defined as $C_S(x,y)$ (diopter).

According to a third preferred aspect of the first to third inventions, the following condition (8) may be satisfied at least in either one of the nasal side portion and the temporal side portion with respect to the principal meridian which satisfies $0 \leq y \leq h$ and $15 \leq (x^2+y^2)^{1/2} \leq 20$:

$$0.010 \leq (C_L(x,y) - C_S(x,y))/(BC_L - BC_S) \leq 0.900 \quad (8).$$

DETAILED DESCRIPTION OF THE PREFERRED EMBODIMENTS

Figure 1:
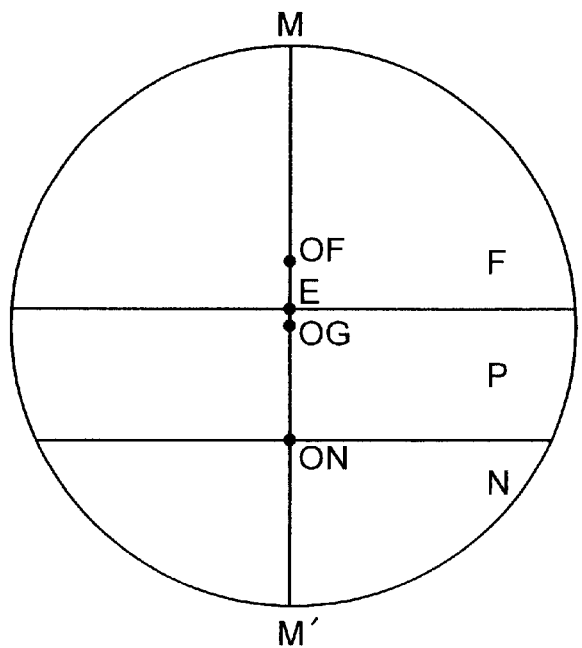
FIG. 1 is a view for showing an outline of the area segmentation of a progressive power multifocal lens which is symmetrically designed.
Figure 2:
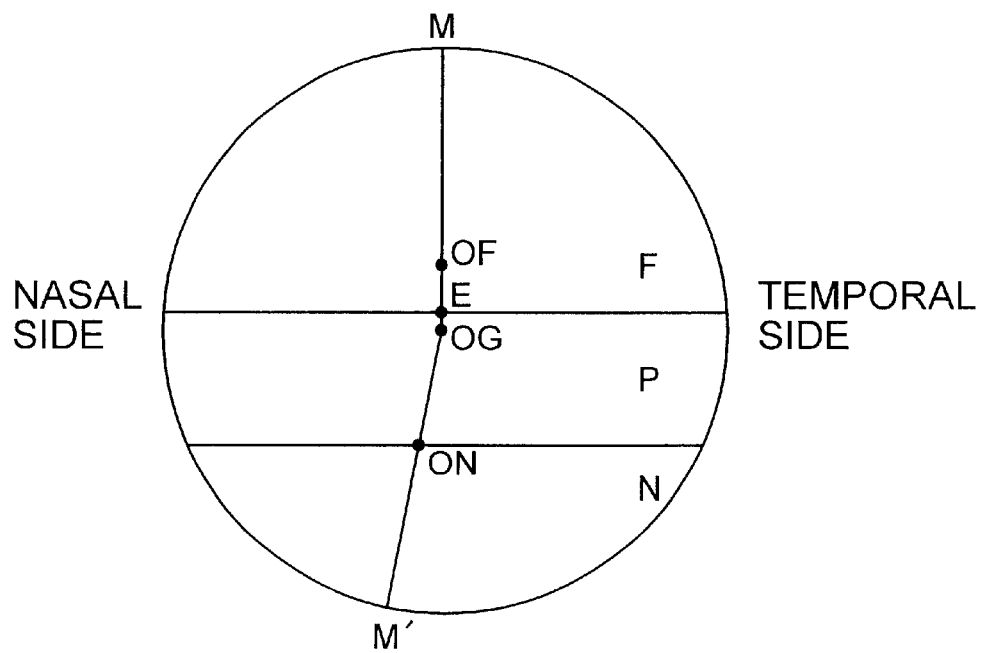
FIG. 2 is a view for schematically showing the area segmentation of an asymmetric-type progressive power multifocal lens in which the near portion N is asymmetrically located taking into consideration that the center of near vision portion is closer to the nasal side in the worn state of the lens.

As described above, according to the prior art, a portion in which an amount of astigmatism is less than a predetermined value, specifically 0.50 diopters or less, is defined as a clear vision range. However, particularly in the far portion, it is not sufficient to define the clear vision range under such condition. Then, according to the present invention, it is considered significant to also suppress an amount of deviation of the dioptric power from the distance vision dioptric power within a small value in a wide range. Thus, a portion in which the astigmatism is smaller than the predetermined value and the amount of deviation of the dioptric power from the distance dioptric power is smaller than the predetermined amount, that is, a portion which satisfies the conditions for both the astigmatism and the dioptric power, is defined as the clear vision range. According to the prior art, there is proposed no such a progressive power multifocal lens which is optimized to simultaneously satisfy these two conditions in a wide range of the far portion.

In a normal progressive power multifocal lenses, there are a plurality of base curves in range to be manufactured from a positive dioptric power to a negative dioptric power. Originally, if the lens can have an optimal progressive power multifocal surface for each distance vision dioptric power, it will be the most preferable for the wearer. However, normally, one progressive power multifocal surface is shared by the base curves within a range of a predetermined distance vision dioptric power, taking the advantages in manufacture or cost into consideration.

Also normally, out of the plurality of base curves, a base curve in a manufacture range with a more positive distance vision dioptric power requires a larger curvature. On the other hand, the curvature of a base curve is smaller in the manufacture range with a more negative distance vision dioptric power. Accordingly, in order to obtain an optical performance of a transmitted light suitable for the equal design specifications in the range for manufacturing the lens by using these equal progressive power multifocal surfaces, it is required to optimize the optical characteristics of the refracting surfaces of progressive power multifocal lenses having a plurality of base curves to conform to each manufacture range or the curvature of each base curve.

According to the present invention, a base curve corresponding to a manufacture range including the distance vision dioptric power of 0.00 diopters is defined as the reference base curve, and a progressive power multifocal surface in this reference base curve is defined as the reference design. Then, the optical performance in the worn state, such as an additional dioptric power distribution or an astigmatism distribution in this reference design are targets to be attained as the optical performance of a progressive power multifocal lens for all of the base curves.

In the base curve in the manufacture range in which the distance vision dioptric power is higher, if the optical characteristics of the progressive power multifocal surface (refracting surface), such as an additional refracting power distribution or an astigmatism distribution are designed to be equal to those of the reference design, the additional dioptric power distribution or the astigmatism distribution caused by a transmitted light are largely different from those in the reference design. That is, in terms of the optical characteristics of the refracting surface such the additional refracting power and the astigmatism, the lenses of these base curves apparently look like progressive power multifocal lenses which are formed in accordance with the single design. However, they turn to be different lenses in terms of the optical characteristics in the worn state, such as the additional dioptric power distribution and the astigmatism distribution caused by the transmitted light beam.

Consequently, according to the present invention, the additional dioptric power distribution and the astigmatism distribution are changed in accordance with a predetermined condition for each base curve corresponding to the manufacture range of each distance vision dioptric power. With this arrangement, in the progressive power multifocal lenses of the respective base curve, the optical characteristics in the worn state such as the additional dioptric power distribution and the astigmatism distribution of the transmitted light are made equal, so as to secure a wide clear vision range with less astigmatism and a smaller amount of blur of an image caused by a dioptric power error in the far portion.

When the additional refracting power distribution on the progressive power multifocal surface is equal in the respective base curves, if the additional dioptric power of a light beam passing through the same coordinate point on the progressive power multifocal surface in the far portion is compared with the additional dioptric power of the reference design to be obtained, there is a tendency that the larger the curvature of the base curve is, the narrower the clear vision range in the far portion becomes since a positive dioptric power is added to the distance vision dioptric power in the periphery of the far portion of the lens. On the contrary, there is a problematic tendency that the smaller the curvature of the base curve is, the narrower the clear vision range in the far portion becomes since a negative dioptric power is added to the distance vision dioptric power in the periphery of the far portion of the lens to form an excessively negative-corrected area, or that the intermediate portion or the near portion in the practical use becomes narrower since an area of the dioptric power which is to be originally added to the intermediate portion or the near portion is narrower.

As a result, in order to make the additional dioptric power distribution of the transmitted light beam in the far portion of the progressive power multifocal lens approximately equal in the different base curves so as to be close to the optical performance in the reference design, it is required to add a negative dioptric power to the distance dioptric power in the periphery of the far portion in the case of a lens having a base curve with a larger curvature, and to add a positive dioptric power to the distance dioptric power in the periphery of the far portion in the case of a lens having a base curve with a smaller curvature. It was found that this requirement can be achieved by adding a positive refracting power to the far portion under a specific condition with respect to a base curve in case of the lens having the base curve with a larger curvature, and adding a negative refracting power to the far portion under a specific condition with respect to a base curve in case of the lens having the base curve with a smaller curvature.

It is noted that, according to the present inventions, a distance in each direction in the worn state takes a positive value in an upper part and a negative value in a lower part in case of the vertical direction in the worn state, with reference to the eyepoint. On the other hand, in case of the horizontal direction in the worn state, the distance takes a positive value on the temporal side and a positive value on the nasal side.

It is preferable that each condition in the present inventions is satisfied in an area which is outside a circle of 15 mm about the eyepoint E and expressed at least by $15 \leq (x^2+y^2)^{1/2}$ (mm) in order to make the optical characteristics in the worn state such as a dioptric power distribution and an astigmatism distribution substantially equal with respect to the respective base curves. With respect to an area which is located within a circle of 15 mm about the eyepoint E and is expressed at least by $(x^2+y^2)^{1/2} < 15$ (mm), an angle (angle of incidence) at which an incident light enters the lens surface is close to 90° so that a change in the dioptric power distribution or an astigmatic difference hardly occurs due to a change of the base curve. Thus, if any of the conditions of the present invention is not satisfied, it exercises only a slight influence.

As a result, if the lens is designed in such a manner that more importance is attached to measurement of a prismatic amount or dioptric power of the lens or optimization of the dioptric power distribution and the astigmatism distribution in the intermediate portion and the near portion thereof, the object of the present invention can be achieved even when any of the the conditions of the present invention is not necessarily satisfied in this area. However, it is preferable that the conditions of the present invention are satisfied in the area expressed by $12 \leq (x^2+y^2)^{1/2}$ (mm), and more preferably, in the area expressed by $10 < (x^2+y^2)^{1/2}$ (mm).

According to "Ocular Physiology" edited by Akira Hagiwara (p.325 to p.328, issued by Igaku Shoin), the range of the central vision field which can be attained only by an eyeball movement with the head being fixed is called a field of fixation. Furthermore, a field of fixation followed by an auxiliary rotation of the head, or the like, is defined as an actual field of fixation. From this point, in the present application, it is considered appropriate to employ the above actual field of fixation in consideration that a normal amount of movement of the visual line when the wearer uses a spectacle lens. That is, a wide clear vision range can be obtained over the entire far portion if the conditions of the present invention are satisfied in a range of the progressive power multifocal surface corresponding to the above actual field of fixation.

Generally, movement of the visual line for looking at a distance point with a progressive power multifocal lens is limited in an upward direction and a right-and-left horizontal direction. In this case, according to the above book, such fact is experimentally verified that an actual field of fixation obtained by a healthy pair of eyes substantially takes the form of a semi-circle of about 40 degrees in the upward direction with the spread of about 50 degrees in the horizontal direction. The angle of revolution of the visual line of 40 degrees is corresponding to a coordinate of about 20 mm on the progressive power multifocal surface of the far portion in the worn state and the angle of revolution of the visual line of 50 degrees is corresponding to about 30 mm, which, however, may fluctuate a little depends on the central thickness of the lens or the curvature of the base curve.

Accordingly, in order to obtain a wide clear vision range in the entire far portion in the practical use, it is preferable that each condition in the present invention is satisfied in a portion having a substantially semi-circular or semi-elliptic form which has a spread of $0 \leq y \leq 20$ (mm) in the vertical direction (upward direction) with reference to the eyepoint E and a spread of $0 \leq |x| \leq 20$ (mm), more preferably of $0 \leq |x| \leq 30$ (mm) in the horizontal direction in at least one of the temporal side portion and the nasal side portion with respect to the principal meridian.

However, as described above, even in this portion having a substantially semi-circular or semi-elliptic form, it is not necessarily required to satisfy the conditions of the present invention in an area which is expressed by $(x^2+y^2)^{1/2} < 15$ (mm). Moreover, in order to obtain a wider clear vision range in a portion in the upward direction of the far portion of the lens, it is preferable to satisfy each of the conditions of the present invention even in an area of $20 < y \leq 30$ (mm). In this case, it is preferable that each of the conditions of the present invention is satisfied in an area which is either one of the temporal side portion or the nasal side portion with respect to the principal meridian and is expressed by $15 \leq (x^2+y^2)^{1/2} \leq 30$ (mm).

On the other hand, an area expressed by $30 < y$ (mm) is actually a portion which is not used often, so that even if the conditions of the present invention are not satisfied, the influence thereof is small in this area and a problem in the practical use is hardly occur. As a result, when a balance of the optical performance of the entire lens is taken into consideration to design the progressive power multifocal lens, it is possible to achieve the object of the present invention even if the conditions of the present invention are not always satisfied in the area of $30 < y$ (mm).

Furthermore, it is preferable that the respective conditions of the present invention are also satisfied in an area expressed by $30 < |x|$ (mm). However, this area is a portion which is not used frequently in the practical use, so that if the conditions of the present invention are not satisfied in this area, the influence thereof is small and a problem in the practical use hardly occur. For this reason, when the progressive power multifocal lens is designed taking into consideration a balance of the optical performance of the entire lens, it is possible to achieve the object of the present invention even if the conditions of the present invention are not always satisfied in the area of $30 < |x|$ (mm).

With respect to areas in the horizontal direction of the lens, an area to be actually used is different depending on the conditions including the width of the eye of the wearer, the eccentricity of the lens, or the form of the lens frame. Generally, when a spectacle lens is put into a glass frame, the lens is usually framed eccentrically toward the nasal side. In this case, the area actually used takes a form narrower on the nasal side, compared with the temporal side, using the principal meridian as the boarder therebetween. As a result, any practical problem hardly occurs if the clear vision range of the far portion is formed narrower in the nasal side portion than in the temporal side portion. For this reason, when the progressive power multifocal lens is designed taking a balance of the optical performance of the entire lens system into consideration, it is possible to design the areas satisfying the conditions of the present invention asymmetric with respect to the principal meridian.

The vicinity of the eyepoint and the lateral side areas of the eyepoint are located in the lowest portion of the far portion and are connected to the intermediate portion serving as a progressive portion, so that a change in the dioptric power in this area easily becomes the largest in the far portion. However, this area serves as a criterion for putting the lens into the glass frame and is very significant in terms of the lens functions. Thus, if a dioptric power distribution in this area is different from the targeted dioptric power distribution, it gives a great influence on the width of the clear vision range of the far portion when the wearer sees in a lateral direction and, furthermore, a swim or a distortion of an image undesirably.

Consequently, in the respective progressive power multifocal lenses having the base curves with different curvatures, it is preferable to satisfy the condition (1) of the present invention in order to make the dioptric power distribution of this area (which includes the vicinity of the eyepoint and the lateral side portions of the eyepoint) substantially equal, to secure a wide clear vision range in the dioptric power in the lower part of the far portion, and to correct a swim or a distortion of the image. In this case, the respective additional refracting powers $\Delta P_S(x,y)$ and $\Delta P_L(x,y)$ in these two base curves are preferably set in such a manner that the absolute value of a difference between the both values becomes gradually larger in a portion closer to the lens periphery.

Since the center of distance vision portion serves as the reference point for measuring the dioptric power of the progressive power multifocal lens and also serves as the reference position when the wearer looks at far point so that the vicinity of the center of distance vision portion and lateral side portions of the center of distance vision portion are very significant areas for allowing the wearer to look at a far point in measuring the lens. As a result, in the respective progressive power multifocal lenses having the base curves with different curvatures, it is preferable to satisfy the condition (2) of the present invention in order to make the dioptric power distribution of this area substantially equal, and to secure a wide clear vision range in the dioptric power of the lower part of the far portion. In this case, the respective additional refracting powers $\Delta P_S(x,y)$ and $\Delta P_L(x,y)$ of these two base curves are preferably set in such a manner that the absolute value of a difference between the both values becomes gradually larger in a portion closer to the lens periphery.

In order to secure a wider area for the clear vision range in the far portion, it is preferable to satisfy both of the above conditions (1) and (2) simultaneously. Furthermore, in order to secure a still wider area for the clear vision range in the far portion, it is preferable to satisfy the condition $\Delta P_S(x,y) > \Delta P_L(x,y)$ in an area which is sandwiched between the above conditions (1) and (2), that is, an area which is sandwiched between a horizontal section curve passing the center of distance vision portion and another horizontal section curve passing the eyepoint and which satisfies $0 \leq y \leq h$ and $15 \leq (x^2+y^2)^{1/2}$, where h is a distance from the eyepoint to the center of distance vision portion in the vertical direction in the lens worn state. In this case, it is preferable that the respective additional refracting powers $\Delta P_S(x,y)$ and $\Delta P_L(x,y)$ in these two base curves are set in such a manner that the absolute value of a difference between the both values becomes gradually larger in a portion closer to the lens periphery.

Also, in the respective progressive power multifocal lenses having the base curves with different curvatures, it is preferable to satisfy the condition (3) of the present invention in order to obtain a substantially equal dioptric power distribution and a wide area for the clear vision range over the entire far portion in a practical use. In this case, the respective additional refracting powers $\Delta P_S(x,y)$ and $\Delta P_L(x,y)$ in these two base curves are preferably set in such a manner that the absolute value of a difference between the both values becomes gradually larger in a portion closer to the lens periphery.

Furthermore, according to the present invention, it is preferable to satisfy the condition (4) of the present invention, in order to obtain a substantially equal dioptric power distribution and a wider area for the clear vision range in the far portions of the respective progressive power multifocal lenses having the base curves with different curvatures. Above the upper limit of this condition (4), the dioptric power is insufficiently corrected by the difference in the dioptric power of the base curve, which is undesirable since not only the dioptric power distributions of the respective base curves can not be made to be substantially equal to each other, but the targeted optical performance can not be attained, whereby only a narrow area can be obtained for the clear vision range.

Below the lower limit of this condition (4), the dioptric power is excessively corrected by the difference in the dioptric power of the base curve, which is undesirable since not only the dioptric power distributions of the respective base curves can not be made to be substantially equal to each other, but the targeted optical performance can not be attained, whereby only a narrow area can be obtained for the clear vision range. For the condition (4), it is preferable to set the lower limit at −0.800. It is more preferable to set the lower limit for the condition (4) at −0.750 and the upper limit at −0.012.

Also according to the present invention, it is preferable to satisfy the following condition (9) in the far vision correction portion which satisfies $15 \leq R(x^2+y^2)^{1/2}$ where $R=(x^2+y^2)^{1/2}$:

$$-0.035 \leq (\Delta P_L(x,y)-\Delta P_S(x,y))/((BC_L-BC_S) \times R) \leq -0.0005 \qquad (9).$$

It is noted that, for the condition (9), it is more preferable to set the lower limit thereof at −0.030 and the upper limit at 0.001.

When the astigmatism distribution on the progressive power multifocal surface is made substantially equal in the respective base curves, if an astigmatism of a light which passes through the same coordinate point on the progressive power multifocal surface in the far portion is compared with the targeted astigmatism of the reference design, in a lens having a base curve with a larger curvature especially in a lower part of the far portion, an area having an astigmatism of 0.50 diopters or smaller is extended up to the intermediate portion. Thus, though the clear vision range in the far portion becomes large and an amount of the astigmatism distributed from the intermediate portion to the near portion resultantly becomes large as a whole, which results in a problem that a distortion or a swim of an image becomes large and the clear vision range in the near portion is inclined to be narrower. On the contrary, in a lens having a base curve with a smaller curvature especially in a lower part of the far portion, an area having the astigmatism of 0.50 diopters or smaller is reduced. Thus, the clear vision range in the far portion is inclined to be narrow.

Accordingly, in order to make an astigmatism distribution of a transmitted light in the lower part of the far portion of the progressive power multifocal lens substantially equal in the different base curves so as to obtain the optical performance close to that of the reference design, it is required to enlarge the astigmatism in the periphery of the lower part of the far portion in case of the lens having the base curve with a larger curvature, and to reduce the astigmatism in the periphery of the lower part of the far portion in case of the lens having the base curve with a smaller curvature. It was found that the above requirement can be achieved by enlarging the astigmatism in the periphery of the lower part of the far portion under a specific condition in case of the lens having the base curve with a larger curvature, and reducing the astigmatism in the periphery of the lower part of the far portion under a specific condition in case of the lens having the base curve with a smaller curvature.

The vicinity of the eyepoint and the lateral side areas of the eyepoint are located in the lowest are of the far portion eyepoint and are connected to the intermediate portion which serves as a progressive portion, so that a change in the dioptric power in this area is liable to become the largest in the far portion and, as a result, the astigmatism thereof becomes the largest in the far portion. However, this area serves as a criterion for putting the lens into a spectacle frame, and is very significant in terms of the lens functions. Thus, if the astigmatism distribution in this area is different from the targeted astigmatism distribution, a space for the clear vision range in the far portion when the wearer looks at a point in a lateral direction is undesirably reduced.

Consequently, in the respective progressive power multifocal lenses having the base curves with different curvatures, it is preferable to satisfy the condition (5) of the present invention in order to make the astigmatism distribution of this area (including the vicinity of the eyepoint and the lateral side portions of the eyepoint) substantially equal, to secure a wide area for the clear vision range in the astigmatism in the lower part of the far portion. In this case, it is preferable that the respective surface astigmatisms of $C_L(x,y)$ and $C_S(x,y)$ in these two base curves are set in such a manner that the absolute value of a difference between the both values becomes gradually larger in an area closer to the lens periphery.

Since the center of distance vision portion serves as the reference point for measuring the dioptric power of the progressive power multifocal lens and also serves as the reference position when the wearer looks at a far point, so that the vicinity of the center of distance vision portion and the lateral side portions of the center of distance vision portion are very significant portions for allowing the wearer to look at a far point measuring the lens. As a result, in the respective progressive power multifocal lenses having the base curves with different curvatures, it is preferable to satisfy the condition (6) of the present invention in order to make the astigmatism distribution of this area substantially equal, and to secure a wide area for the clear vision range in the astigmatism in the lower part of the far portion. In this case, it is preferable that the respective surface astigmatisms $C_L(x,y)$ and $C_S(x,y)$ in these two base curves are set in such a manner that the absolute value of a difference between the both values becomes gradually larger in an area closer to the lens periphery.

In order to secure a wider area for the clear vision range in the far portion, it is preferable to satisfy both of the above conditions (5) and (6) simultaneously. In this case, it is preferable that the respective surface astigmatisms $C_L(x,y)$ and $C_S(x,y)$ in these two base curves are set in such a manner that the absolute value of a difference between the both values becomes gradually larger in an area closer to the lens periphery.

Furthermore, in the respective progressive power multifocal lenses having the base curves with different curvatures, in order to obtain a substantially equal astigmatism and to obtain a wide area for the clear vision range in lower part of the far portion, it is preferable to satisfy the condition (7) of the present invention in an entire area which is sandwiched between the above conditions (5) and (6), that is, an area satisfying $0 \leq y \leq h$ and $15 \leq (x^2+y^2)^{1/2}$. In this case, the respective surface astigmatisms $C_L(x,y)$ and $C_S(x,y)$ in these two base curves are preferably set in such a manner that the absolute value of a difference between the both values becomes gradually larger in an area closer to the lens periphery.

Furthermore, it is preferable to satisfy the condition (8) of the present invention, in order to obtain a substantially equal astigmatism distribution and a wider clear vision range in lower part of the far portion of the respective progressive power multifocal lenses having the base curves with different curvatures. Below the lower limit of this condition (8), correction of the astigmatism by the curvature difference of the base curve is insufficient, which is undesirable since not only the astigmatism distributions of the respective base curves can not be made substantially equal to each other, but the targeted optical performance can not be attained, thereby making the clear vision range to be narrow.

Above the upper limit of this condition (8), correction of the astigmatism by the curvature difference of the base curve becomes excessive, which is undesirable since not only the astigmatism distributions of the respective base curves can not be made to be substantially equal to each other, but the targeted optical performance can not be attained, thereby making the clear vision range to be narrow. For the condition (8), it is preferable to set the lower limit at 0.150 and the upper limit at 0.850. It is more preferable to set the lower limit at 0.200 for the condition (8), and the upper limit at 0.800.

Also according to the present invention, it is preferable to satisfy the following condition (10) in an area satisfying $0 \leq y \leq h$ and $15 \leq R=(x^2+y^2)^{1/2}$, when $R=(x^2+y^2)^{1/2}$:

$$0.0010 \leq (C_L(x,y)-C_S(x,y))/((BC_L-BC_S) \times R) \leq 0.0400 \qquad (10).$$

Noted that, for the condition (10), it is more preferable to set the lower limit at 0.0015 and the upper limit at 0.0350.

Embodiments of the present invention will be described below with reference to the attached drawings.

Figure 3:
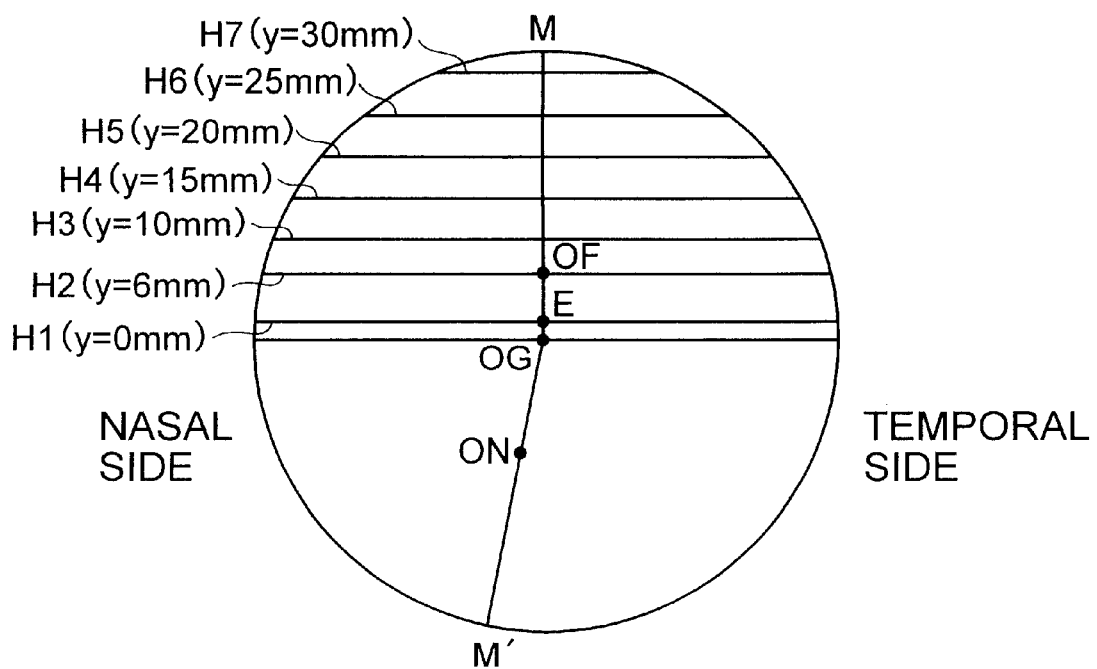
FIG. 3 is a view for showing a progressive power multifocal lens for a left eye according to an embodiment of the present invention, for explaining a horizontal section curve which is expressed by a line of intersection between a flat plane perpendicular to the principal meridian and a refracting surface.

FIG. 3 is a view for showing a progressive power multifocal lens for a left eye according to an embodiment of the present invention, in which a horizontal section curve indicated by the line of intersection between a plane surface perpendicular to the principal meridian and the refracting surface will be explained. In this embodiment, a distribution of the additional refracting power and a distribution of astigmatisms of the progressive power multifocal lens are plotted along this horizontal section curve. Referring to FIG. 3, H1 denotes a horizontal section curve which passes through the eyepoint E, and H2 another horizontal section curve which passes through the center of distance vision portion OF. H3 to H7 denote horizontal section curves when the distance (height) y from the eyepoint E in the vertical direction is 10 (mm), 15 (mm), 20 (mm), 25 (mm) and 30 (mm), respectively. In the present embodiment, the invention will be described by attaching importance to a progressive power multifocal lens for a left eye. However, the same description will be applied for a progressive power multifocal lens for a right eye.

Figure 4:
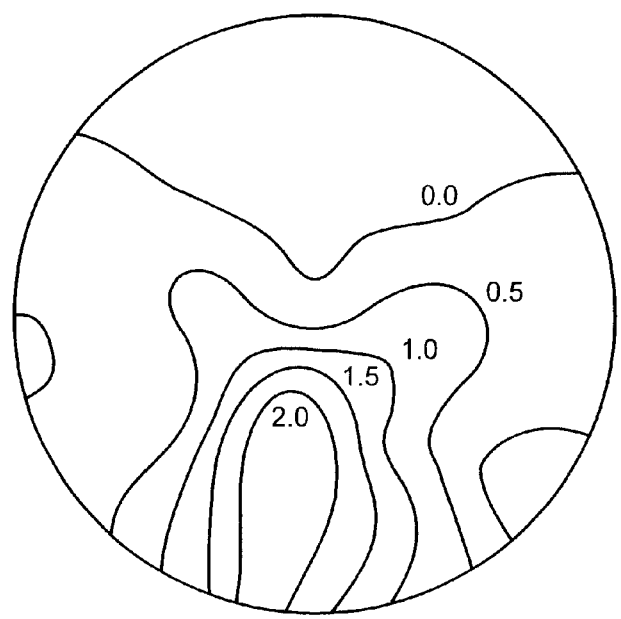
FIG. 4 is a distribution view of an additional dioptric power in a transmitted light beam of a progressive power multifocal lens according to the reference design of the present embodiment.
Figure 5:
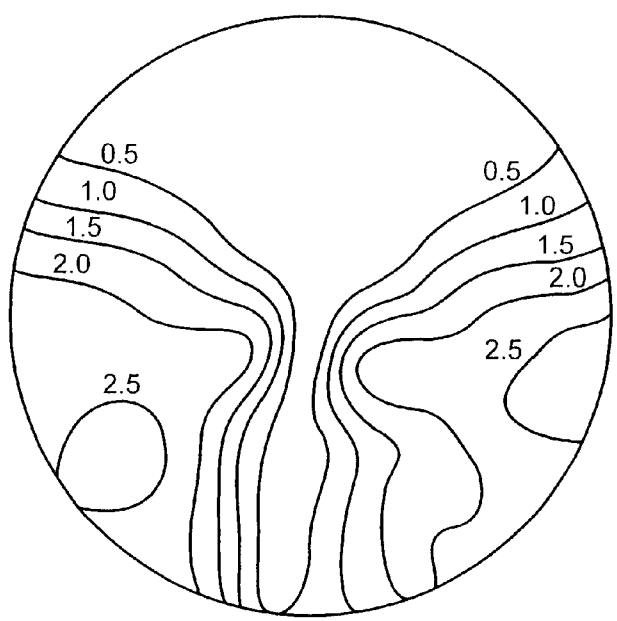
FIG. 5 is a distribution view of an astigmatism in a transmitted light beam of a progressive power multifocal lens according to the reference design of the present embodiment.

FIG. 4 is a view of an additional dioptric power distribution in a light beam transmitted from the progressive power multifocal lens serving as the reference design in an embodiment of the present invention. FIG. 5 is a view of an astigmatism distribution in a light beam transmitted from a progressive power multifocal lens according to the reference design of the present embodiment.

In the progressive power multifocal lens serving as the reference design of the present embodiment, the outer diameter Ø is 70 mm, the base curve BC is 4.20 diopters, the distance vision dioptric power DF is 0.00 diopter, the additional power Ad is 2.00 diopters, the refractive index ne of the lens is 1.67, the eyepoint E is positioned above the geometric center OG of the lens by 2 mm, and the center of distance vision portion OF is positioned above the geometric center OG of the lens by 8 mm.

In the progressive power multifocal lens according to the present embodiment, the optical performance of the transmitted light beam in the reference design with the reference base curve BC of 4.20 diopters is employed as the basic optical performance. For this reason, in this embodiment, it is aimed by the design to approximate a distribution of an additional dioptric power and a distribution of astigmatism of another progressive power multifocal lens having another base curve to those of the progressive power multifocal lens of the reference design, as shown in FIG. 4 and FIG. 5.

Figure 6:
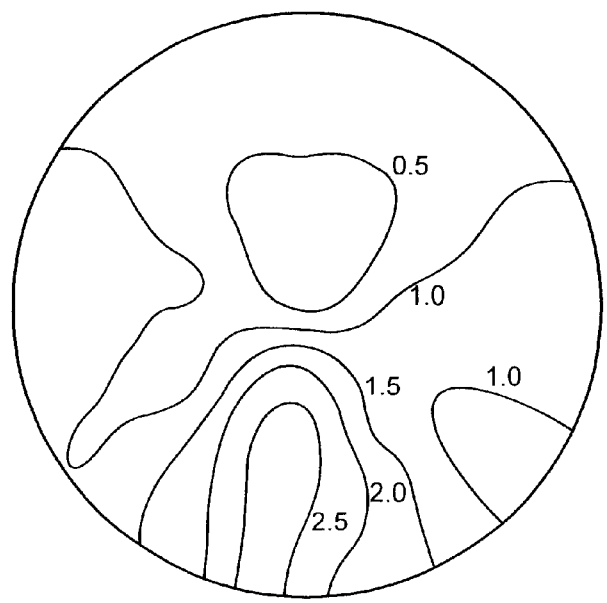
FIG. 6 is a distribution view of an additional dioptric power in a transmitted light beam of a progressive power multifocal lens as the first comparative example with respect to the reference design of the present embodiment.
Figure 7:
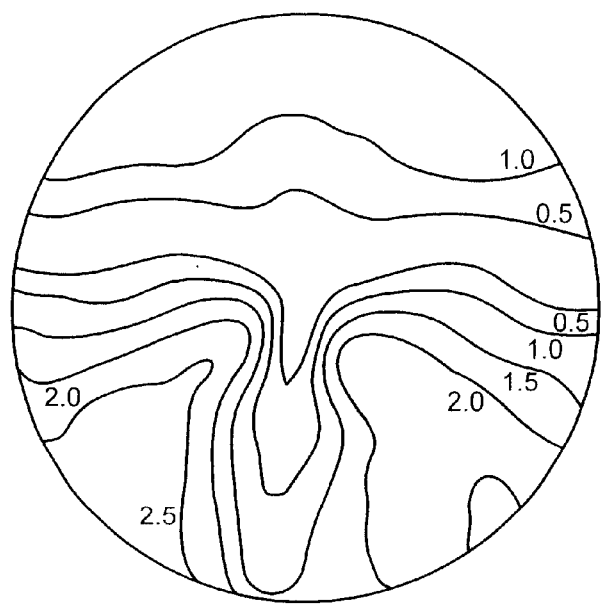
FIG. 7 is a distribution view of astigmatism in a transmitted light beam of a progressive power multifocal lens according to the first comparative example.

FIG. 6 is a view of a distribution of additional dioptric power in a light beam transmitted from a progressive power multifocal lens according to a first comparative example with respect to the reference design of the present embodiment. FIG. 7 is a view of a distribution of astigmatism in a transmitted light beam of the progressive power multifocal lens according to the first comparative example. The progressive power multifocal lens according to the first comparative example is designed such that a distribution of an additional refracting power and a distribution of an astigmatism of the progressive power multifocal lens thereof are substantially equal to those of the progressive power multifocal lens according to the reference design of the present embodiment.

In the progressive power multifocal lens according to the first comparative example, the-outer diameter Ø is 70 mm, the base curve BC is 5.60 diopters, the distance vision dioptric power DF is +3.50 diopter, the additional power Ad is 2.00 diopters, the refractive index ne of the lens is 1.67, the eyepoint E is positioned above the geometric center OG of the lens by 2 mm, and the center of distance vision portion OF is positioned above the geometric center OG of the lens by 8 mm. As described above, the reference design of the present embodiment and the first comparative example are different from each other in the base curve and the distance vision dioptric power. That is, the progressive power multifocal lens of the first comparative example having a larger curvature than the reference design of the present embodiment is designed such that a distribution of an surface additional refracting power and a distribution of astigmatism of the progressive power multifocal surface are substantially equal to those of the reference design of the present embodiment.

When FIG. 4 and FIG. 6 are compared with each other, it is found that, in the progressive power multifocal lens of the first comparative example, an area in which the absolute value of the additional dioptric power is not more than 0.50 diopters in the far portion is limited to a narrow area around the eyepoint E and the center of distance vision portion OF. As a result, the wearer of the progressive power multifocal lens of the first comparative example can look at a far point only in this limited narrow area. In other words, the progressive power multifocal lens of the first comparative example is a lens having a narrow clear vision range in the far portion.

When FIG. 5 and FIG. 7 are compared with each other, it is found that, in the far portion of the first comparative example, an area having the astigmatism of 0.50 diopters or less has a conspicuously different distribution tendency of the astigmatism and, moreover, has a smaller space serving as the clear vision range, compared with those in an area having the astigmatism of 0.50 diopters or less in the far portion of the reference design.

Figure 8:
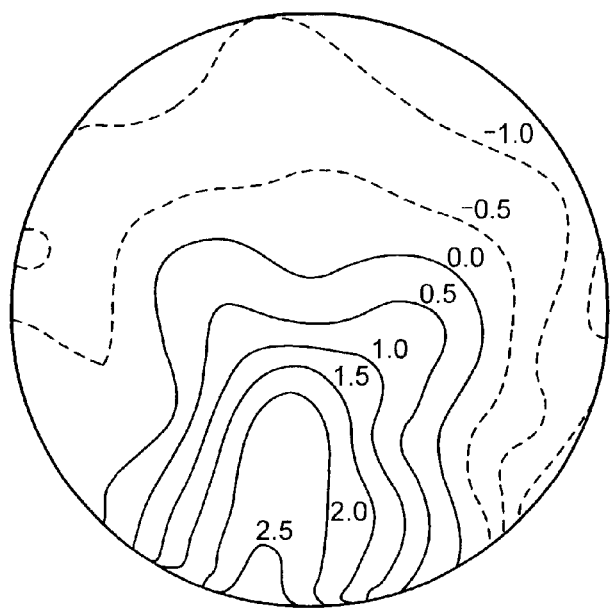
FIG. 8 is a distribution view of an additional dioptric power in a transmitted light beam of a progressive power multifocal lens as the second comparative example with respect to the reference design of the present embodiment.
Figure 9:
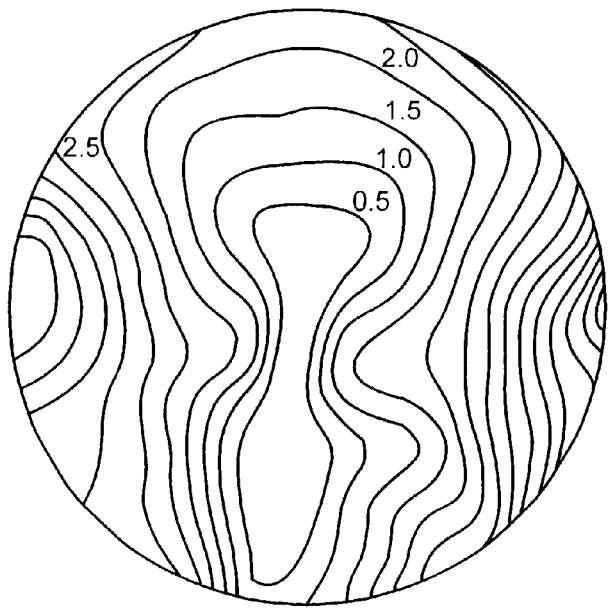
FIG. 9 is a distribution view of astigmatism in a transmitted light beam of a progressive power multifocal lens according to the second comparative example.

FIG. 8 is a distribution view of an additional dioptric power in a light beam transmitted from a progressive power multifocal lens as a second comparative example with respect to the reference design of the present embodiment. FIG. 9 is a distribution view of an astigmatism in a light beam transmitted from the progressive power multifocal lens according to the second comparative example. The progressive power multifocal lens according to the second comparative example is designed such that the additional refracting power distribution and the astigmatism distribution thereof are substantially equal to those of the progressive power multifocal lens according to the reference design of the present embodiment.

In the progressive power multifocal lens according to the second comparative example, the outer diameter Ø is 70 mm, the base curve BC is 2.00 diopters, the distance vision dioptric power DF is −2.50 diopter, the additional power Ad is 2.00 diopters, the refractive index ne of the lens is 1.67, the eyepoint E is positioned above the geometric center OG of the lens by 2 mm, and the center of distance vision portion OF is positioned above the geometric center OG of the lens by 8 mm. As described, the reference design of the present embodiment and the second comparative example are different from each other in the base curve and the distance vision dioptric power. That is, the progressive power multifocal lens of the second comparative example having a smaller curvature than the reference design of the present embodiment is designed such that a distribution of an additional refracting power and a distribution of an astigmatism of the progressive power multifocal surface are substantially equal to those of the reference design of the present embodiment.

When FIG. 4 and FIG. 8 are compared with each other, it is found that, in the progressive power multifocal lens of the second comparative example, an area in which the absolute value of the additional dioptric power is not more than 0.50 diopters in the far portion is conspicuously narrow since a negative excessively-corrected area is extended on the periphery of the far portion, compared with an area in which the absolute value of the additional dioptric power is not more than 0.50 diopters in the far portion of the reference design. As a results, the clear vision range of the second comparative example is narrow. Furthermore, according to the second comparative example, it is found that the additional power to be originally added to the intermediate portion is small.

When FIG. 5 and FIG. 9 are compared with each other, it is found that, in the progressive power multifocal lens of the first comparative example, an area in which the absolute value of the astigmatism is not more than 0.50 diopters in the far portion is limited to a very narrow area around the eyepoint E and the center of distance vision portion so that the clear vision range of the far portion is conspicuously narrow. In addition, particularly in a lateral side area in a lower part of the far portion, the absolute amount of the astigmatism is very large, which causes a large stray, swim, and distortion of an image.

Figure 10:
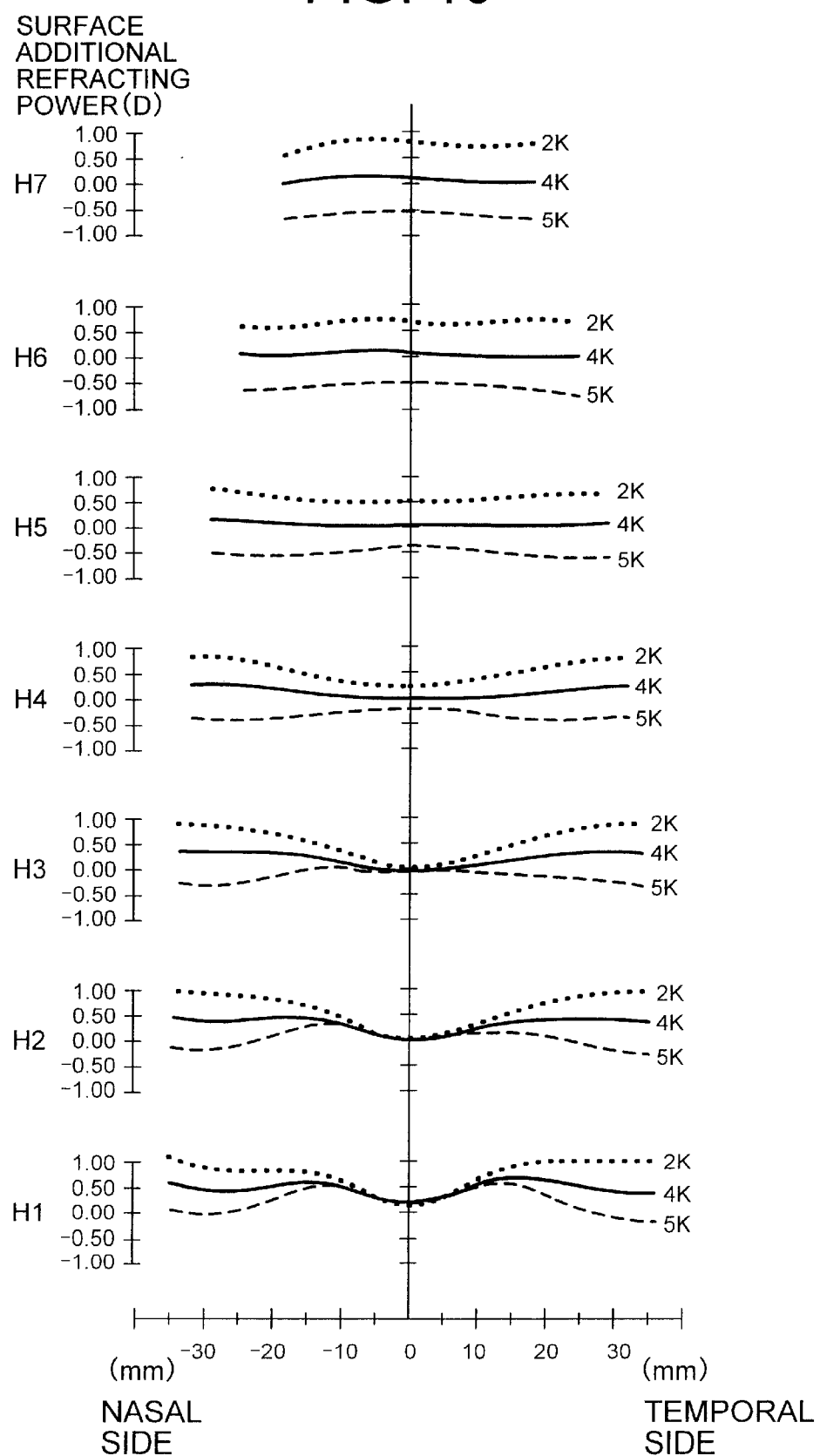
FIG. 10 is a distribution view of surface additional refracting power along the horizontal section curves H1 to H7 in the far portion of each of the progressive power multifocal lenses according to the present embodiment.
Figure 11:
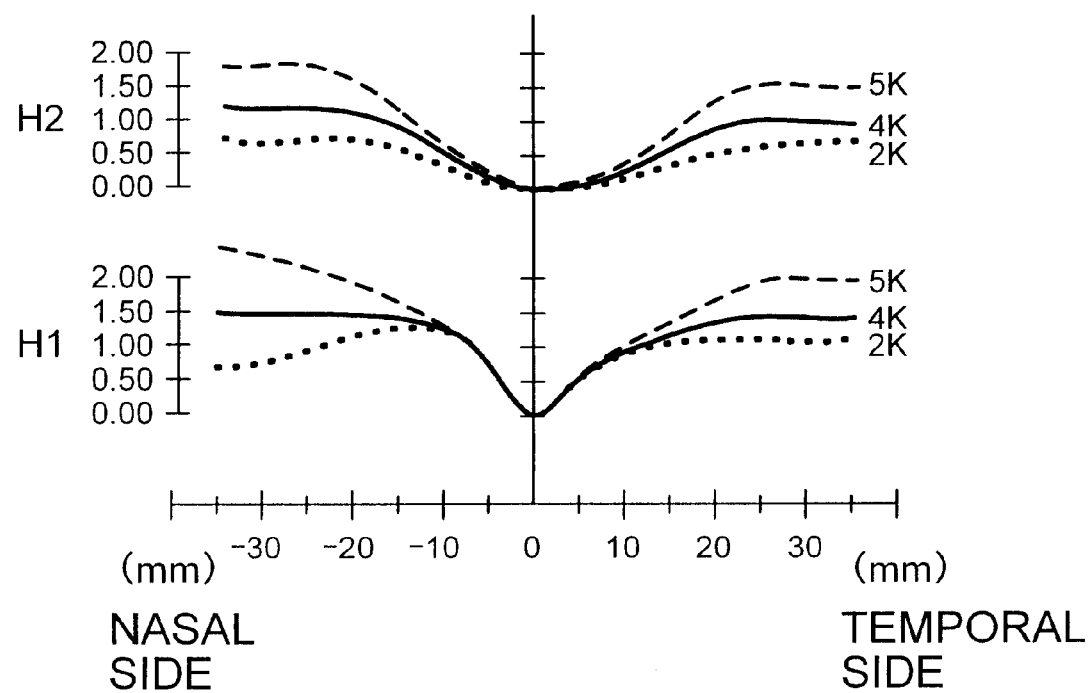
FIG. 11 is a distribution view of astigmatism along the horizontal section curves H1 to H2 in the far portion of each of the progressive power multifocal lenses according to the present embodiment.

FIG. 10 is a distribution view of the additional refracting power along the horizontal section curves H1 to H7 in the far portion of each progressive power multifocal lens according to the present embodiment. FIG. 11 is a distribution view of the astigmatism along the horizontal section curves H1 to H2 in the far portion of each progressive power multifocal lens according to the present embodiment. Referring to FIGS. 10 and 11, the abscissa indicates a distance X (mm) from the principal meridian in the horizontal direction in the worn state. It is noted that the distance X have a positive value on the temporal side, and a negative value on the nasal side. The additional refracting power and the surface astigmatism along the horizontal section curves H1 to H7 are shown in D (diopters).

On the other hand, in FIGS. 10 and 11, 4K (indicated by the solid lines in the drawings) denotes the reference design progressive power multifocal lens having the reference base curve BC of 4.20 diopters, while 5K (indicated by the broken lines in the drawings) denotes a first progressive power multifocal lens having the base curve BC of 5.60 diopters with a larger curvature than that of the reference design. Furthermore, 2K (indicated by the dotted lines in the drawings) denotes a second progressive power multifocal lens having the base curve BC of 2.00 diopters with a smaller curvature than that of the reference design. Details of the first and second progressive power multifocal lenses according to the present embodiment will be described later.

Referring to FIG. 10, in each of the progressive power multifocal lenses according to the present embodiment, it is found that an area of the far portion (both of the temporal side and the nasal side) satisfying $15 \leq (x^2+y^2)^{1/2}$ satisfies the following condition (3). As a result, it is clear that, in the present embodiment, the area also satisfies the conditions (1) and (2).

$$\Delta P_S(x,y) > \Delta P_L(x,y) \tag{3}$$

Also referring to FIG. 11, in each of the progressive power multifocal lenses according to the present embodiment, it is found that an area (both of the temporal side and the nasal side) satisfying $0 \leq y \leq h$ (h=6 mm in the present embodiment) and $15 \leq (x^2+y^2)^{1/2}$ satisfies the following condition (7). As a result, it is clear that, in the present embodiment, the area also satisfies the conditions (5) and (6).

$$C_L(x,y) > C_S(x,y) \tag{7}$$

Referring to the following tables (1) to (6), corresponding values are to be verified with respect to the conditions (4) and (9). The table (1) shows the values for the condition (4) between the reference design progressive power multifocal lens having the reference base curve BC of 4.20 diopters and the first progressive power multifocal lens having the base curve BC of 5.60 diopters which is a larger curvature than that of the reference design. It is noted that in the tables (1) to (6), the distance x (mm) in the horizontal direction is shown in the columns and the horizontal section curves H1 to H7 are shown in the rows, corresponding to FIG. 10.

TABLE 1

|     | H1     | H2     | H3     | H4     | H5     | H6     | H7     |
|-----|--------|--------|--------|--------|--------|--------|--------|
| −30 | −0.308 | −0.397 |        |        |        |        |        |
| −25 | −0.274 | −0.349 | −0.404 | −0.445 |        |        |        |
| −20 | −0.185 | −0.260 | −0.322 | −0.390 | −0.432 |        |        |
| −15 | −0.068 | −0.123 | −0.192 | −0.288 | −0.390 | −0.432 |        |
| −10 |        |        |        | −0.199 | −0.356 | −0.452 |        |
| −5  |        |        |        | −0.158 | −0.329 | −0.445 | −0.473 |
| 0   |        |        |        | −0.144 | −0.295 | −0.418 | −0.445 |
| 5   |        |        |        | −0.164 | −0.308 | −0.404 | −0.432 |
| 10  |        |        |        | −0.219 | −0.342 | −0.411 |        |
| 15  | −0.096 | −0.137 | −0.185 | −0.301 | −0.411 | −0.459 |        |
| 20  | −0.199 | −0.226 | −0.274 | −0.356 | −0.432 |        |        |
| 25  | −0.295 | −0.322 | −0.349 | −0.404 |        |        |        |
| 30  | −0.370 | −0.397 |        |        |        |        |        |

The table (2) shows the values for the condition (4) between the reference design progressive power multifocal lens having the reference base curve BC of 4.20 diopters and the second progressive power multifocal lens having the base curve BC with a smaller curvature of 2.00 diopters than that of the reference design.

TABLE 2

|     | H1     | H2     | H3     | H4     | H5     | H6     | H7     |
|-----|--------|--------|--------|--------|--------|--------|--------|
| −30 |        | −0.213 | −0.241 |        |        |        |        |
| −25 |        | −0.167 | −0.213 | −0.222 | −0.241 |        |        |
| −20 |        | −0.134 | −0.171 | −0.185 | −0.204 | −0.231 |        |
| −15 |        | −0.083 | −0.120 | −0.144 | −0.181 | −0.227 | −0.269 |
| −10 |        |        |        | −0.157 | −0.227 | −0.287 |        |
| −5  |        |        |        | −0.125 | −0.222 | −0.292 | −0.324 |
| 0   |        |        |        | −0.106 | −0.208 | −0.282 | −0.310 |

TABLE 2-continued

| H1 | H2 | H3 | H4 | H5 | H6 | H7 |
|---|---|---|---|---|---|---|
| 5 | | | −0.120 | −0.208 | −0.278 | −0.306 |
| 10 | | | −0.162 | −0.236 | −0.292 | |
| 15 | −0.106 | −0.120 | −0.153 | −0.204 | −0.269 | −0.319 |
| 20 | −0.162 | −0.171 | −0.194 | −0.231 | −0.278 | |
| 25 | −0.208 | −0.204 | −0.218 | −0.241 | | |
| 30 | −0.241 | −0.241 | | | | |

The table (3) shows the values for the condition (4) between the first progressive power multifocal lens having the base curve BC with a smaller curvature of 5.60 diopters than that of the reference design and the second progressive power multifocal lens having the base curve BC with a smaller curvature of 2.00 diopters than that of the reference design.

TABLE 3

| H1 | H2 | H3 | H4 | H5 | H6 | H7 |
|---|---|---|---|---|---|---|
| −30 | −0.251 | −0.304 | | | | |
| −25 | −0.210 | −0.263 | −0.296 | −0.323 | | |
| −20 | −0.155 | −0.207 | −0.240 | −0.279 | −0.312 | |
| −15 | −0.077 | −0.122 | −0.163 | −0.224 | −0.293 | −0.334 |
| −10 | | | −0.174 | −0.279 | −0.354 | |
| −5 | | | −0.138 | −0.265 | −0.354 | −0.384 |
| 0 | | | −0.122 | −0.243 | −0.337 | −0.365 |
| 5 | | | −0.138 | −0.249 | −0.329 | −0.356 |
| 10 | | | −0.185 | −0.279 | −0.340 | |
| 15 | −0.102 | −0.127 | −0.166 | −0.243 | −0.326 | −0.376 |
| 20 | −0.177 | −0.193 | −0.227 | −0.282 | −0.340 | |
| 25 | −0.243 | −0.251 | −0.271 | −0.307 | | |
| 30 | −0.293 | −0.304 | | | | |

As described above, with reference to the tables (1) to (3), it is found that, in each of the progressive power multifocal lenses according to the present embodiment, the following condition (4) is satisfied by the area in the far portion (both of the temporal side and the nasal side) which satisfies $15 \leq (x^2+y^2)^{1/2}$.

$$-0.850 \leq (\Delta P_L(x,y) - \Delta P_S(x,y))/(BC_L - BC_S) \leq -0.010 \quad (4).$$

The table (4) shows the values for the condition (9) between the reference design progressive power multifocal lens having the reference base curve BC of 4.20 diopters and the first progressive power multifocal lens having the base curve BC with a larger curvature of 5.60 diopters than that of the reference design.

TABLE 4

| H1 | H2 | H3 | H4 | H5 | H6 | H7 |
|---|---|---|---|---|---|---|
| −30 | −0.0103 | −0.0130 | | | | |
| −25 | −0.0110 | −0.0136 | −0.0150 | −0.0153 | | |
| −20 | −0.0092 | −0.0125 | −0.0144 | −0.0156 | −0.0153 | |
| −15 | −0.0046 | −0.0076 | −0.0106 | −0.0136 | −0.0156 | −0.0148 |
| −10 | | | 0.0110 | −0.0159 | −0.0168 | |
| −5 | | | 0.0100 | −0.0159 | −0.0175 | −0.0155 |
| 0 | | | −0.0096 | −0.0147 | −0.0167 | −0.0148 |
| 5 | | | −0.0104 | −0.0150 | −0.0159 | −0.0142 |
| 10 | | | −0.0122 | −0.0153 | −0.0153 | |
| 15 | −0.0064 | −0.0085 | −0.0103 | −0.0142 | −0.0164 | −0.0157 |
| 20 | −0.0099 | −0.0108 | −0.0123 | −0.0142 | −0.0153 | |
| 25 | −0.0118 | −0.0125 | −0.0130 | −0.0139 | | |
| 30 | −0.0123 | −0.0130 | | | | |

The table (5) shows the values for the condition (9) between the reference design progressive power multifocal lens having the reference base curve BC of 4.20 diopters and the second progressive power multifocal lens having the base curve BC with a smaller curvature of 2.00 diopters than that of the reference design.

TABLE 5

| | H1 | H2 | H3 | H4 | H5 | H6 | H7 |
|---|---|---|---|---|---|---|---|
| −30 | −0.0071 | −0.0079 | | | | | |
| −25 | −0.0067 | −0.0083 | −0.0083 | −0.0083 | | | |
| −20 | −0.0067 | −0.0082 | −0.0083 | −0.0081 | −0.0082 | | |
| −15 | −0.0056 | −0.0075 | −0.0080 | −0.0085 | −0.0091 | −0.0092 | |
| −10 | | | −0.0087 | −0.0101 | −0.0107 | | |
| −5 | | | −0.0079 | −0.0108 | −0.0114 | −0.0107 | |
| 0 | | | −0.0071 | −0.0104 | −0.0113 | −0.0103 | |
| 5 | | | −0.0076 | −0.0101 | −0.0109 | −0.0100 | |
| 10 | | | −0.0090 | −0.0106 | −0.0108 | | |
| 15 | −0.0071 | −0.0075 | −0.0085 | −0.0096 | −0.0107 | −0.0110 | |
| 20 | −0.0081 | −0.0082 | −0.0087 | −0.0093 | −0.0098 | | |
| 25 | −0.0083 | −0.0079 | −0.0081 | −0.0083 | | | |
| 30 | −0.0080 | −0.0079 | | | | | |

The table (6) shows the values for the condition (9) between the first progressive power multifocal lens having the base curve BC with a larger curvature of 5.60 diopters than that of the reference design and the second progressive power multifocal lens having the base curve BC with a smaller curvature of 2.00 diopters than that of the reference design.

TABLE 6

| | H1 | H2 | H3 | H4 | H5 | H6 | H7 |
|---|---|---|---|---|---|---|---|
| −30 | −0.0084 | −0.0099 | | | | | |
| −25 | −0.0084 | −0.0104 | −0.0110 | −0.0111 | | | |
| −20 | −0.0077 | −0.0099 | −0.0107 | −0.0112 | −0.0110 | | |
| −15 | −0.0052 | −0.0075 | −0.0090 | −0.0105 | −0.0117 | −0.0115 | |
| −10 | | | −0.0097 | −0.0125 | −0.0131 | | |
| −5 | | | −0.0087 | −0.0129 | −0.0139 | −0.0126 | |
| 0 | | | −0.0081 | −0.0122 | −0.0135 | −0.0122 | |
| 5 | | | −0.0087 | −0.0121 | −0.0129 | −0.0117 | |
| 10 | | | −0.0103 | −0.0125 | −0.0126 | | |
| 15 | −0.0068 | −0.0079 | −0.0092 | −0.0115 | −0.0130 | −0.0129 | |
| 20 | −0.0088 | −0.0093 | −0.0101 | −0.0113 | −0.0120 | | |
| 25 | −0.0097 | −0.0098 | −0.0101 | −0.0105 | | | |
| 30 | −0.0098 | −0.0099 | | | | | |

As described above, with reference to the tables (4) to (6), it is found that, in each of the progressive power multifocal lenses according to the present embodiment, the following condition (9) is satisfied by the area in the far portions (both of the temporal side and the nasal side) which satisfies $15 \leq (x^2+y^2)^{1/2}$.

$$-0.035 \leq (\Delta P_L(x,y) - \Delta P_S(x,y))/((BC_L - BC_S) \times R) \leq -0.0005 \quad (9).$$

Referring to the following tables (7) to (12), the corresponding values are to be verified with respect to the conditions (8) and (10). The table (7) shows the values for the condition (8) between the reference design progressive power multifocal lens having the reference base curve BC of 4.20 diopters and the first progressive power multifocal lens having the base curve BC of 5.60 diopters which is a larger curvature than that of the reference design. It is noted that in the tables (7) to (12), the distance x (mm) in the horizontal direction is shown the columns and the horizontal section curves H1 and H2 are shown in the rows, corresponding to FIG. 11.

TABLE 7

| | H1 | H2 |
|---|---|---|
| −30 | 0.555 | 0.438 |
| −25 | 0.479 | 0.438 |

TABLE 7-continued

| | H1 | H2 |
|---|---|---|
| −20 | 0.322 | 0.342 |
| −15 | 0.116 | 0.171 |
| −10 | | |
| −5 | | |
| 0 | | |
| 5 | | |
| 10 | | |
| 15 | 0.137 | 0.178 |
| 20 | 0.226 | 0.295 |
| 25 | 0.322 | 0.363 |
| 30 | 0.377 | 0.384 |

The table (8) shows the values for the condition (8) between the reference design progressive power multifocal lens having the reference base curve BC of 4.20 diopters and the second progressive power multifocal lens having the base curve BC with a smaller curvature of 2.00 diopters than that of the reference design.

TABLE 8

|     | H1    | H2    |
| --- | ----- | ----- |
| -30 | 0.343 | 0.250 |
| -25 | 0.250 | 0.218 |
| -20 | 0.171 | 0.190 |
| -15 | 0.079 | 0.153 |
| -10 |       |       |
| -5  |       |       |
| 0   |       |       |
| 5   |       |       |
| 10  |       |       |
| 15  | 0.069 | 0.111 |
| 20  | 0.139 | 0.190 |
| 25  | 0.167 | 0.208 |
| 30  | 0.176 | 0.176 |

The table (9) shows the values for the condition (8) between the first progressive power multifocal lens having the base curve BC with a larger curvature of 5.60 diopters than that of the reference design and the second progressive power multifocal lens having the base curve BC with a smaller curvature of 2.00 diopters than that of the reference design.

TABLE 9

|     | H1    | H2    |
| --- | ----- | ----- |
| -30 | 0.428 | 0.326 |
| -25 | 0.343 | 0.307 |
| -20 | 0.232 | 0.251 |
| -15 | 0.094 | 0.160 |
| -10 |       |       |
| -5  |       |       |
| 0   |       |       |
| 5   |       |       |
| 10  |       |       |
| 15  | 0.097 | 0.138 |
| 20  | 0.174 | 0.232 |
| 25  | 0.229 | 0.271 |
| 30  | 0.257 | 0.260 |

As described above, with reference to the tables (7) to (9), it is found that, in each of the progressive power multifocal lenses according to the present embodiment, the following condition (8) is satisfied by the area (both of the temporal side and the nasal side) which satisfies $0 \leq y \leq h$ (h=6 mm in the present embodiment) and $15 \leq (x^2+y^2)^{1/2}$.

$$-0.010 \leq (C_L(x,y) - C_S(x,y))/(BC_L - BC_S) \leq 0.900 \quad (8).$$

The table (10) shows the values for the condition (10) between the reference design progressive power multifocal lens having the reference base curve BC of 4.20 diopters and the first progressive power multifocal lens having the base curve BC with a larger curvature of 5.60 diopters than that of the reference design.

TABLE 10

|     | H1     | H2     |
| --- | ------ | ------ |
| -30 | 0.0185 | 0.0143 |
| -25 | 0.0192 | 0.0171 |
| -20 | 0.0161 | 0.0164 |
| -15 | 0.0078 | 0.0106 |
| -10 |        |        |
| -5  |        |        |
| 0   |        |        |
| 5   |        |        |
| 10  |        |        |
| 15  | 0.0091 | 0.0110 |
| 20  | 0.0113 | 0.0141 |
| 25  | 0.0129 | 0.0141 |
| 30  | 0.0126 | 0.0125 |

The table (11) shows the values for the condition (10) between the reference design progressive power multifocal lens having the reference base curve BC of 4.20 diopters and the second progressive power multifocal lens having the base curve BC with a smaller curvature of 2.00 diopters than that of the reference design.

TABLE 11

|     | H1     | H2     |
| --- | ------ | ------ |
| -30 | 0.0114 | 0.0082 |
| -25 | 0.0100 | 0.0085 |
| -20 | 0.0086 | 0.0091 |
| -15 | 0.0052 | 0.0095 |
| -10 |        |        |
| -5  |        |        |
| 0   |        |        |
| 5   |        |        |
| 10  |        |        |
| 15  | 0.0046 | 0.0069 |
| 20  | 0.0069 | 0.0091 |
| 25  | 0.0067 | 0.0081 |
| 30  | 0.0059 | 0.0058 |

The table (12) shows the values for the condition (10) between the first progressive power multifocal lens having the base curve BC with a larger curvature of 5.60 diopters than that of the reference design and the second progressive power multifocal lens having the base curve BC with a smaller curvature of 2.00 diopters than that of the reference design.

TABLE 12

|     | H1     | H2     |
| --- | ------ | ------ |
| -30 | 0.0143 | 0.0107 |
| -25 | 0.0137 | 0.0119 |
| -20 | 0.0116 | 0.0120 |
| -15 | 0.0063 | 0.0099 |
| -10 |        |        |
| -5  |        |        |
| 0   |        |        |
| 5   |        |        |
| 10  |        |        |
| 15  | 0.0064 | 0.0085 |
| 20  | 0.0087 | 0.0111 |
| 25  | 0.0092 | 0.0105 |
| 30  | 0.0086 | 0.0085 |

As described above, with reference to the tables (10) to (12), it is found that, in each of the progressive power multifocal lenses according to the present embodiment, the following condition (10) is satisfied by the area (both of the temporal side and the nasal side) which satisfies $0 \leq y \leq h$ (h=6 mm in the present embodiment) and $15 \leq (x^2+y^2)^{1/2}$.

$$-0.0010 \leq (C_L(x,y) - C_S(x,y))/((BC_L - BC_S) \times R) \leq 0.0400 \quad (10).$$

Figure 12:
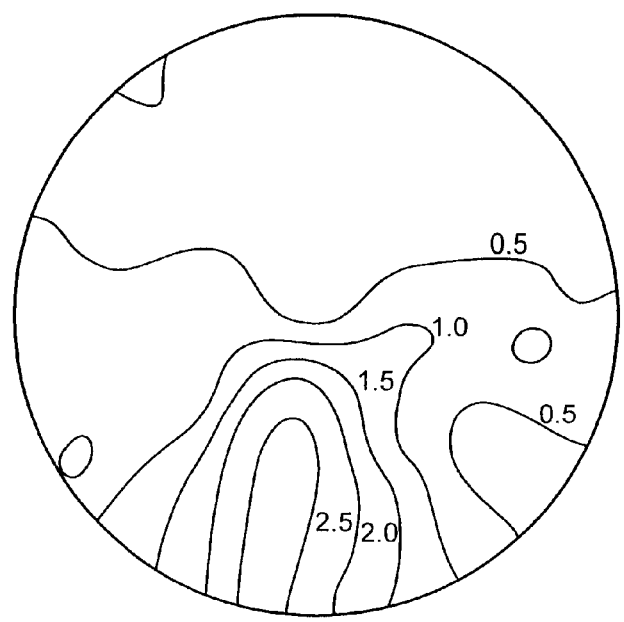
FIG. 12 is a distribution view of additional aspherical dioptric power in a transmitted light beam of the first progressive power multifocal lens which is a progressive power multifocal lens according to the present embodiment and has a base curve with a larger curvature than that of the reference design.

FIG. 12 is a view of a distribution of additional dioptric power in a transmitted light beam of the first progressive power multifocal lens which is a progressive power multifocal lens according to the present embodiment and has a base curve with a larger curvature than the reference design. On the other hand, FIG. 13 is a view of a distribution of astigmatism in a transmitted light beam of the first progressive power multifocal lens according to the present embodiment.

In the first progressive power multifocal lens according to the present embodiment, like in the lens of the first comparative example, the outer diameter Ø is 70 mm, the base curve BC is 5.60 diopters, the distance vision dioptric power Df is +3.50 diopter, the additional power Ad is 2.00 diopters, the refractive index ne of the lens is 1.67, the eyepoint E is positioned above the geometric center OG of the lens by 2 mm, and the center of distance vision portion OF is positioned above the geometric center OG of the lens by 8 mm.

When FIG. 4, FIG. 6 and FIG. 12 are compared with one another, it is found that, in the first progressive power multifocal lens according to the present embodiment, the area in which the absolute value of the additional dioptric power is not more than 0.50 diopters in the far portion is improved to be conspicuously wider over the entire far portion, compared with that of the first comparative example, so as to have an additional dioptric power distribution approximate to that of the reference design.

Figure 13:
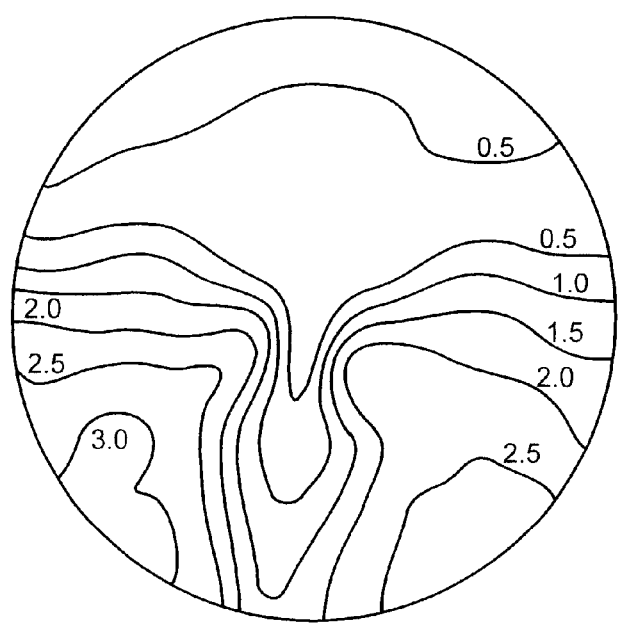
FIG. 13 is a distribution view of astigmatism in a transmitted light beam of the first progressive power multifocal lens according to the present embodiment.

When FIG. 5, FIG. 7 and FIG. 13 are compared with one another, it is found that, in the first progressive power multifocal lens according to the present embodiment, the area in which the astigmatism in the far portion is not more than 0.50 diopters is widened, compared with that of the first comparative example, so as to have an astigmatism distribution approximate to that of the reference design.

Figure 14:
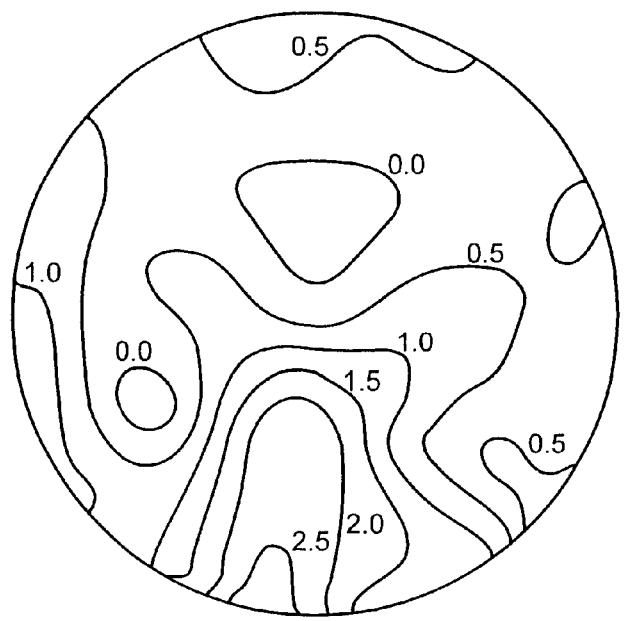
FIG. 14 is a distribution view of additional dioptric power in a transmitted light beam of the second progressive power multifocal lens which is a progressive power multifocal lens according to the present embodiment and has a base curve with a smaller curvature than that of the reference design.

FIG. 14 is a view of a distribution of additional dioptric power in a transmitted light beam of the second progressive power multifocal lens which is a progressive power multifocal lens according to the present embodiment and has a base curve with a smaller curvature than that of the reference design. On the other hand, FIG. 15 is a view of a distribution of astigmatism in a transmitted light beam of the second progressive power multifocal lens according to the present embodiment.

In the second progressive power multifocal lens according to the present embodiment, like in the lens according to the second comparative example, the outer diameter Ø is 70 mm, the base curve BC is 2.00 diopters, the distance vision dioptric power Df is −2.50 diopter, the additional power Ad is 2.00 diopters, the refractive index ne of the lens is 1.67, the eyepoint E is positioned above the geometric center OG of the lens by 2 mm, and the center of distance vision portion OF is positioned above the geometric center OG of the lens by 8 mm.

When FIG. 4, FIG. 8 and FIG. 14 are compared with one another, it is found that, in the second progressive power multifocal lens according to the present embodiment, the area in which the absolute value of the additional dioptric power is not more than 0.50 diopters in the far portion is improved to be conspicuously wide over the entire far portion, compared with that of the second comparative example, so as to have an additional dioptric power distribution approximate to that of the reference design.

Figure 15:
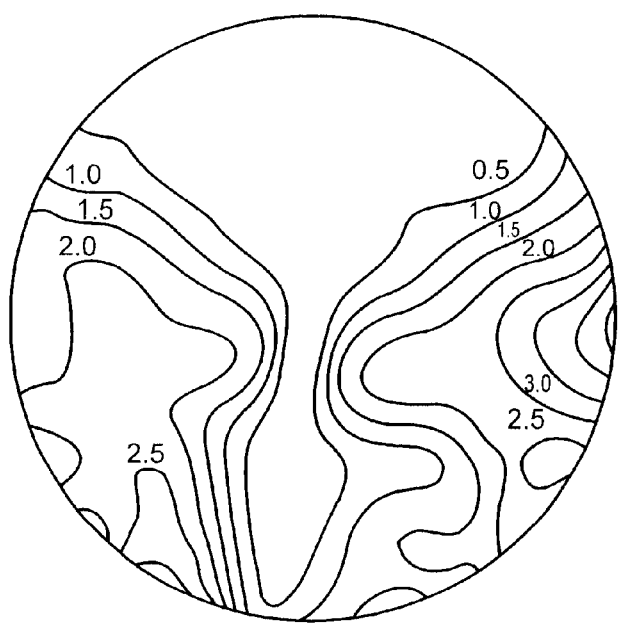
FIG. 15 is a distribution view of astigmatism in a transmitted light beam of the second progressive power multifocal lens according to the present embodiment.

When FIG. 5, FIG. 9 and FIG. 15 are compared with one another, it can be understood that, in the second progressive power multifocal lens according to the present embodiment, the area in which the astigmatism in the far portion is not more than 0.50 diopters is improved to be conspicuously wide over the entire far portion, compared with that of the second comparative example, so as to have an astigmatism distribution approximate to that of the reference design.

As described above, according to the present invention, it is possible to securely obtain a wide clear vision range which has an additional dioptric power of not more than 0.50 diopters and astigmatism of not more than 0.50 diopters in the far portion in each of the base curves with different curvatures, so as to be approximated to the optical performance in the worn state of the reference design of the present embodiment.

It is noted that the present invention is not limited to the foregoing embodiments, but clearly can be applied to variety of progressive power multifocal lenses of different specifications and materials.

As described in the foregoing, according to the present invention, in a series of progressive power multifocal lenses having a plurality of base curves which are designed to have substantially the same basic specifications of the lens, it is possible make the optical characteristics in the worn state to be substantially equal with respect to all of the base curves, so as to realize a progressive power multifocal lens capable of obtaining the excellent optical performance in the worn state. It is also possible to securely obtain a wide area for the clear vision range which has a less astigmatism and a smaller blur of an image caused by the dioptric power error.

What is claimed is:

1. A series of progressive power multifocal lenses having a plurality of base curves designed to have substantially the same basic lens specifications, each lens having a far vision correction portion corresponding to a distant vision, a near vision correction portion corresponding to a near vision, and a progressive portion for continuously connecting the refracting powers of the surfaces of the both portions between said far vision correction portion and said near vision correction portion along the principal meridian for dividing the refracting surface of each lens into the nasal side portion and the temporal side portion, characterized in that:

the following condition (1) is satisfied at least in either one of said nasal side portion and said temporal side portion with respect to said principal meridian which satisfies $15 \leq |x| \leq 20$:

$$\Delta P_S(x,0) > \Delta P_L(x,0) \tag{1}$$

Where:
in a first progressive power multifocal lens having a first base curve $BC_L$ selected from said plurality of base curves, the mean surface refracting power of a point on a lens refracting surface which is separated by x (mm) in the horizontal direction from an eyepoint for a distance vision in a state in which the lens is worn is defined as $P_L(x,0)$ (diopter), and the mean surface additional refracting power which is obtained by subtracting said first base curve $BC_L$ from said mean surface refracting power is defined as $\Delta P_L(x,0)$ $\{=P_L(x,0)-BC_L\}$ (diopter); and
in a second progressive power multifocal lens having a second base curve $BC_S$ which has a substantially smaller curvature than said first base curve $BC_L$ and selected from said plurality of base curves and having substantially the same additional power as the additional power of said first progressive multifocal lens, the mean surface refracting power of a point on a lens refracting surface which is separated by x (mm) in the horizontal direction from the eyepoint in a state in which the lens is worn as $P_S(x,0)$ (diopter), and the mean surface additional refracting power which is obtained by subtracting said second base curve $BC_S$ from said mean surface refracting power is defined as $\Delta P_S(x,0)$ $\{=P_S(x,0)-BC_S\}$ (diopter).

2. A series of progressive power multifocal lenses having a plurality of base curves designed to have substantially the same basic lens specifications, each lens having a far vision correction portion corresponding to a distant vision, a near vision correction portion corresponding to a near vision, and a progressive portion for continuously connecting the refracting powers of the surfaces of the both portions between said far vision correction portion and said near vision correction portion along the principal meridian for dividing the refracting surface of each lens into the nasal side portion and the temporal side portion characterized in that:

the following condition (2) is satisfied at least in either one of said nasal side portion and said temporal side portion with respect to said principal meridian which satisfies $15 \leq (x^2+h^2)^{1/2} \leq 20$:

$$\Delta P_S(x,h) > \Delta P_L(x,h) \qquad (2),$$

Where:
in a first progressive power multifocal lens having a first base curve $BC_L$ selected from said plurality of base curves, the mean surface refracting power of a point on a lens refracting surface which is separated by x (mm) in the horizontal direction in a state in which the lens is worn from the center of distance vision portion which is separated by h (mm) from the eyepoint for a distance vision in the vertical direction in a state in which the lens is worn is defined as $P_L(x,h)$ (diopter), and the mean surface additional refracting power which is obtained by subtracting said first base curve $BC_L$ from said mean surface refracting power $P_L(x,h)$ is defined as $\Delta P_L(x,h)$ {=$P_L(x,h)-BC_L$} (diopter); and in a second progressive power multifocal lens having a second base curve $BC_S$ which has a substantially smaller curvature than said first base curve $BC_L$ and selected from said plurality of base curves and having substantially the same additional power as the additional power of said first progressive multifocal lens, the mean surface refracting power of a point on a lens refracting surface which is separated by x (mm) in the horizontal direction in a state in which the lens is worn is defined as $P_S(x,h)$ (diopter), and the mean surface additional refracting power which is obtained by subtracting said second base curve $BC_S$ from said mean surface refracting power is defined as $\Delta P_S(x,h)$ {=$P_S(x,h)-BC_S$} (diopter).

3. A series of progressive power multifocal lenses having a plurality of base curves designed to have substantially the same basic lens specifications, each lens having a far vision correction portion corresponding to a distant vision, a near vision correction portion corresponding to a near vision, and a progressive portion for continuously connecting the refracting powers of the surfaces of the both portions between said far vision correction portion and said near vision correction portion along the principal meridian for dividing the refracting surface of each lens into the nasal side portion and the temporal side portion characterized in that:

the following condition (3) is satisfied at least in either one portion of said nasal side portion and said temporal side portion with respect to said principal meridian which satisfies $15 \leq (x^2+y^2)^{1/2} \leq 20$:

$$\Delta P_S(x,y) > \Delta P_L(x,y) \qquad (3),$$

Where:
in a first progressive power multifocal lens having a first base curve $BC_L$ selected from said plurality of base curves, the mean surface refracting power of a point on a lens refracting surface which is separated by x (mm) in the horizontal direction in a state in which the lens is worn from the eyepoint for a distance vision and which is separated by y (mm) in the vertical direction from the eyepoint in a state in which the lens is worn is defined as $P_L(x,h)$ (diopter), and the mean surface additional refracting power which is obtained by subtracting said first base curve $BC_L$ from said mean surface refracting power is defined as $\Delta P_L(x,y)$ {=$P_L(x,y)-BC_L$} (diopter); and in a second progressive power multifocal lens having a second base curve $BC_S$ which has a substantially smaller curvature than said first base curve $BC_L$ and selected from said plurality of base curves and having substantially the same additional power as the additional power of said first progressive multifocal lens, the mean surface refracting power of an arbitrary point on a lens refracting surface which is separated by x (mm) in the horizontal direction in a state in which the lens is worn from said eyepoint and which is separated by y (mm) from the eyepoint in the vertical direction in a state in which the lens is worn is defined as $P_S(x,y)$ (diopter), and the mean surface additional refracting power which is obtained by subtracting said second base curve $BC_S$ from said mean surface refracting power is defined as $\Delta P_S(x,y)$ {=$P_S(x,y)-BC_S$} (diopter).

4. A series of progressive power multifocal lenses according to claim 3, wherein the following condition (4) is satisfied in at least one of the far vision correction portion on said nasal side and that on said temporal side with respect to said principal meridian which satisfies $15 \leq (x^2+y^2)^{1/2} \leq 20$:

$$-0.850 \leq (\Delta P_1(x,y) - \Delta P_S(x,y))/(BC_L - BC_S) \leq -0.010 \qquad (4).$$

5. A series of progressive power multifocal lenses according to any one of claims 1 to 4, wherein the following condition (5) is satisfied at least in either one of said nasal side portion and said temporal side portion with respect to said principal meridian which satisfies $15 \leq |x| \leq 20$:

$$C_L(x,0) > C_S(x,0) \qquad (5),$$

Where:
in said first progressive multifocal lens, the surface astigmatism of a point on a lens refracting surface which is separated from said eyepoint by x (mm) in the horizontal direction in a state in which the lens is worn is defined as $CL(x,0)$ (diopter); and in said second progressive multifocal lens, the surface astigmatism of a point on a lens refracting surface which is separated from said eyepoint by x (mm) in the horizontal direction in a state in which the lens is worn is defined as $CS(x,0)$ (diopter).

6. A series of progressive power multifocal lenses according to any one of claims 1 to 4, wherein the following condition (6) is satisfied at least in either one of said nasal side portion and said temporal side portion with respect to said principal meridian which satisfies $15 \leq (x^2+h^2)^{1/2} \leq 20$:

$$C_L(x,h) > C_S(x,h) \qquad (6),$$

where:
in said first progressive multifocal lens, the surface astigmatism of a point on a lens refracting surface which is separated by x (mm) in the horizontal direction in a state in which the lens is worn from said center of distance vision portion which is separated from said eyepoint by h (mm) in the vertical direction in a state in which the lens is worn is defined as $C_L(x,h)$ (diopter); and in said second progressive multifocal lens, the surface astigmatism of a point on a lens refracting surface which is separated from said center of distance vision portion by x (mm) in the horizontal direction in a state in which the lens is worn is defined as $C_S(x,h)$ (diopter).

7. A series of progressive power multifocal lenses according to any one of claims 1 to 4, wherein the following condition (7) is satisfied at least in either one of said nasal side portion and said temporal side portion with respect to said principal meridian which satisfies $0 \leq y \leq h$ and $15 \leq (x^2+y^2)^{1/2} \leq 20$:

$$C_L(x,y) > C_S(x,y) \tag{7}$$

where:

a distance between said eyepoint and the center of distance vision portion in a state in the vertical direction in which the lens is worn is defined as h (mm);

in said first progressive multifocal lens, the surface astigmatism of an arbitrary point on a lens refracting surface which is separated by x (mm) in the horizontal direction in a state in which the lens is worn from said eyepoint and is separated by y (mm) in the vertical direction in a state in which the lens is worn from said eyepoint is defined as $C_L(x,y)$ (diopter); and in said second progressive multifocal lens, the surface astigmatism of an arbitrary point on a lens refracting surface which is separated by x (mm) in the horizontal direction in the lens wearing state from said eyepoint and is separated by y (mm) in the vertical direction in a state in which the lens is worn from said eyepoint is defined as $C_S(x,y)$ (diopter).

8. A series of progressive power multifocal lenses according to claim 7, wherein the following condition (8) is satisfied at least in either one of said nasal side portion and said temporal side portion with respect to said principal meridian which satisfies $0 \leq y \leq h$ and $15 \leq (x^2+y^2)^{1/2} \leq 20$:

$$0.010 \leq (C_L(x,y) - C_S(x,y))/(BC_L - BC_S) \leq 0.900 \tag{8}$$

9. A series of progressive power multifocal lenses according to claim 5, wherein the following condition (6) is satisfied at least in either one of said nasal side portion and said temporal side portion with respect to said principal meridian which satisfies $15 \leq (x^2+h^2)^{1/2} \leq 20$:

$$C_L(x,h) > C_S(x,h) \tag{6}$$

where:

in said first progressive multifocal lens, the surface astigmatism of a point on a lens refracting surface which is separated by x (mm) in the horizontal direction in a state in which the lens is worn from said center of distance vision portion which is separated from said eyepoint by h (mm) in the vertical direction in a state in which the lens is worn is defined as $C_L(x,h)$ (diopter); and in said second progressive multifocal lens, the surface astigmatism of a point on a lens refracting surface which is separated from said center of distance vision portion by x (mm) in the horizontal direction in a state in which the lens is worn is defined as $C_S(x,h)$ (diopter).

10. A series of progressive power multifocal lenses according to claim 5, wherein the following condition (7) is satisfied at least in either one of said nasal side portion and said temporal side portion with respect to said principal meridian which satisfies $0 \leq y \leq h$ and $15 \leq (x^2+y^2)^{1/2} \leq 20$:

$$C_L(x,y) > C_S(x,y) \tag{7}$$

where:

a distance between said eyepoint and the center of distance vision portion in a state in the vertical direction in which the lens is worn is defined as h (mm);

in said first progressive multifocal lens, the surface astigmatism of an arbitrary point on a lens refracting surface which is separated by x (mm) in the horizontal direction in a state in which the lens is worn from said eyepoint and is separated by y (mm) in the vertical direction in a state in which the lens is worn from said eyepoint is defined as $C_L(x,y)$ (diopter); and in said second progressive multifocal lens, the surface astigmatism of an arbitrary point on a lens refracting surface which is separated by x (mm) in the horizontal direction in the lens wearing state from said eyepoint and is separated by y (mm) in the vertical direction in a state in which the lens is worn from said eyepoint is defined as $C_S(x,y)$ (diopter).

11. A series of progressive power multifocal lenses according to claim 6, wherein the following condition (7) is satisfied at least in either one of said nasal side portion and said temporal side portion with respect to said principal meridian which satisfies $0 \leq y \leq h$ and $15 \leq (x^2+y^2)^{1/2} \leq 20$:

$$C_L(x,y) > C_S(x,y) \tag{7}$$

where:

a distance between said eyepoint and the center of distance vision portion in a state in the vertical direction in which the lens is worn is defined as h (mm);

in said first progressive multifocal lens, the surface astigmatism of an arbitrary point on a lens refracting surface which is separated by x (mm) in the horizontal direction in a state in which the lens is worn from said eyepoint and is separated by y (mm) in the vertical direction in a state in which the lens is worn from said eyepoint is defined as $C_L(x,y)$ (diopter); and in said second progressive multifocal lens, the surface astigmatism of an arbitrary point on a lens refracting surface which is separated by x (mm) in the horizontal direction in the lens wearing state from said eyepoint and is separated by y (mm) in the vertical direction in a state in which the lens is worn from said eyepoint is defined as $C_S(x,y)$ (diopter).

12. A series of progressive power multifocal lenses according to claim 9, wherein the following condition (7) is satisfied at least in either one of said nasal side portion and said temporal side portion with respect to said principal meridian which satisfies $0 \leq y \leq h$ and $15 \leq (x^2+y^2)^{1/2} \leq 20$:

$$C_L(x,y) > C_S(x,y) \tag{7}$$

where:

a distance between said eyepoint and the center of distance vision portion in a state in the vertical direction in which the lens is worn is defined as h (mm);

in said first progressive multifocal lens, the surface astigmatism of an arbitrary point on a lens refracting surface which is separated by x (mm) in the horizontal direction in a state in which the lens is worn from said eyepoint and is separated by y (mm) in the vertical direction in a state in which the lens is worn from said eyepoint is defined as $C_L(x,y)$ (diopter); and in said second progressive multifocal lens, the surface astigmatism of an arbitrary point on a lens refracting surface which is separated by x (mm) in the horizontal direction in the lens wearing state from said eyepoint and is separated by y (mm) in the vertical direction in a state in which the lens is worn from said eyepoint is defined as $C_S(x,y)$ (diopter).

13. A series of progressive power multifocal lenses according to claim 10, wherein the following condition (8) is satisfied at least in either one of said nasal side portion and said temporal side portion with respect to said principal meridian which satisfies $0 \leq y \leq h$ and $15 \leq (x^2+y^2)^{1/2} \leq 20$:

$$0.010 \leq (C_L(x,y) - C_S(x,y))/(BC_L - BC_S) \leq 0.900 \qquad (8).$$

14. A series of progressive power multifocal lenses according to claim 11, wherein the following condition (8) is satisfied at least in either one of said nasal side portion and said temporal side portion with respect to said principal meridian which satisfies $0 \leq y \leq h$ and $15 \leq (x^2+y^2)^{1/2} \leq 20$:

$$0.010 \leq (C_L(x,y) - C_S(x,y))/(BC_L - BC_S) \leq 0.900 \qquad (8).$$

15. A series of progressive power multifocal lenses according to claim 12, wherein the following condition (8) is satisfied at least in either one of said nasal side portion and said temporal side portion with respect to said principal meridian which satisfies $0 \leq y \leq h$ and $15 \leq (x^2+y^2)^{1/2} \leq 20$:

$$0.010 \leq (C_L(x,y) - C_S(x,y))/(BC_L - BC_S) \leq 0.900 \qquad (8).$$

* * * * *